(12) United States Patent
DeMoss et al.

(10) Patent No.: US 12,385,542 B2
(45) Date of Patent: Aug. 12, 2025

(54) OPEN COIL SPRING ASSEMBLIES

(71) Applicant: Sealy Technology, LLC, Trinity, NC (US)

(72) Inventors: Larry K. DeMoss, Greensboro, NC (US); Brian M. Manuszak, Thomasville, NC (US); Kevin M. Tar, Summerfield, NC (US); Darin T. Thomas, Salisbury, NC (US); Daniel W. Green, Victoria (AU); Morrison J. Just, Victoria (AU)

(73) Assignee: SEALY TECHNOLOGY LLC, Trinity, NC (US)

( * ) Notice: Subject to any disclaimer, the term of this patent is extended or adjusted under 35 U.S.C. 154(b) by 0 days.

(21) Appl. No.: 18/650,817

(22) Filed: Apr. 30, 2024

(65) Prior Publication Data

US 2024/0280155 A1   Aug. 22, 2024

Related U.S. Application Data

(63) Continuation of application No. 17/939,502, filed on Sep. 7, 2022, now Pat. No. 12,135,066, which is a continuation of application No. 16/469,379, filed as application No. PCT/US2017/066671 on Dec. 15, 2017, now Pat. No. 11,480,228.

(60) Provisional application No. 62/434,668, filed on Dec. 15, 2016.

(51) Int. Cl.
*F16F 1/12* (2006.01)
*A47C 23/043* (2006.01)
*A47C 23/05* (2006.01)
*F16F 3/02* (2006.01)

(52) U.S. Cl.
CPC ............... *F16F 1/12* (2013.01); *F16F 3/02* (2013.01); *A47C 23/043* (2013.01); *A47C 23/05* (2013.01)

(58) Field of Classification Search
CPC .. F16F 1/12; F16F 3/02; A47C 23/043; A47C 23/05; A47C 27/07; A47C 23/0522
See application file for complete search history.

(56) References Cited

U.S. PATENT DOCUMENTS

| 260,162 | A |   | 6/1882 | Bushnell |
|---|---|---|---|---|
| 699,866 | A |   | 5/1902 | Cottrell |
| 1,573,570 | A |   | 2/1926 | Platt et al. |
| 1,678,400 | A |   | 7/1928 | William |
| 1,727,654 | A |   | 9/1929 | William |
| 1,854,503 | A | * | 4/1932 | Dietrich ............ A47C 23/0522 5/273 |
| 2,058,462 | A | * | 10/1936 | Karr ................... A47C 23/0522 5/267 |

(Continued)

FOREIGN PATENT DOCUMENTS

| CN | 101038015 A | 8/2009 |
|---|---|---|
| CN | 103313629 B | 8/2016 |
| WO | 2014057085 A2 | 11/2014 |

*Primary Examiner* — Thomas W Irvin
(74) *Attorney, Agent, or Firm* — Stites & Harbison, PLLC; Terry L. Wright; James R. Hayne

(57) ABSTRACT

Present embodiments provide various open coil spring assemblies which perform like an encased spring assembly. The embodiments have elastic lacings or connections which connect springs to springs or springs to lacings. Various spring embodiments are provided as well as various arrangements for the elastic lacings. All of these features improve compliance and stability while reducing motion transfer.

5 Claims, 21 Drawing Sheets

(56) References Cited

U.S. PATENT DOCUMENTS

| | | | | |
|---|---|---|---|---|
| 2,102,066 | A | * | 12/1937 | Gleason ................. A47C 23/05 5/260 |
| 2,113,377 | A | * | 4/1938 | Krakauer ........... A47C 23/0522 5/272 |
| 2,116,796 | A | * | 5/1938 | Levine ............... A47C 23/0522 5/273 |
| 2,142,399 | A | * | 1/1939 | Krakauer ........... A47C 23/0522 5/269 |
| 2,197,131 | A | * | 4/1940 | Levine ............... A47C 23/0522 5/273 |
| 2,232,072 | A | * | 2/1941 | Levine ................... B21F 33/04 140/3 CA |
| 2,291,868 | A | | 8/1942 | Stephen |
| 2,832,966 | A | | 5/1958 | Elliott |
| 3,087,169 | A | * | 4/1963 | Melen .................... A47C 27/07 5/259.1 |
| 3,774,248 | A | * | 11/1973 | Huras ................ A47C 23/0522 5/267 |
| 3,789,440 | A | * | 2/1974 | Garceau ................. A47C 7/347 5/267 |
| 4,004,304 | A | * | 1/1977 | Kane ....................... A47C 23/05 5/267 |
| 4,372,546 | A | * | 2/1983 | Ramsey ............. A47C 23/0438 267/100 |
| 5,509,642 | A | | 4/1996 | Wells |
| D409,024 | S | | 5/1999 | Wagner et al. |
| D575,564 | S | | 8/2008 | Eigenmann et al. |
| 7,578,016 | B1 | | 8/2009 | McCraw |
| 2007/0235915 | A1 | | 10/2007 | Ahn |
| 2015/0084250 | A1 | | 3/2015 | Ahn |
| 2020/0237107 | A1 | | 7/2020 | Ahn |

\* cited by examiner

OPEN COIL SPRING ASSEMBLIES

CLAIM TO PRIORITY

This application is a continuation application of U.S. application Ser. No. 17/939,502, filed Sep. 7, 2022 as a continuation application of Ser. No. 16/469,379, filed Jun. 13, 2019 as a 371 national stage application PCT International Patent Application No. PCT/US2017/066671, filed Dec. 15, 2017 and which claims priority to and benefit of U.S. Provisional Patent Application Ser. No. 62/434,668, filed Dec. 15, 2016 and titled "Open Coil Spring Assemblies", all of which are incorporated by reference herein.

TECHNICAL FIELD

The present embodiments relate to open coil spring assemblies which have performance like pocketed coil assemblies. In particular, the present embodiments relate to open coil spring assemblies that make use of an elastic lacing, elastic connections or other connecting methods and structures to join together a plurality of open coil springs in a manner that improves compliance, reduces motion transfer and bounce across the plurality of open coil springs and allows each of the open coil springs to move more independently of one another.

BACKGROUND

In an open spring assembly of a mattress core, open innersprings, which are also referred to as open coil springs, have traditionally been attached to one another using a helical wire lacing mechanism. In particular, in such an assembly, the helical wire lacing mechanism joins each row of open coil springs together and thereby sets the spacing of each spring segment to fairly fixed and rigid locations. Some flexure of the helical wire lacing mechanism is allowed in such spring assemblies and allows for some degree of conformity of the coil springs in the assembly with a user's body. However, the rigid wire lacing of the coil springs is generally regarded as serving to reduce that conformity.

In this regard, traditional spring assemblies comprised of a plurality of open coil springs have also suffered from excessive motion transfer due to the connectivity provided by the lacing of the open coil springs with a helical wire mechanism in the form of rigid steel helical wires. One alternative to those rigid spring assemblies has been spring assemblies that include a plurality of pocketed coil springs, as such pocketed coil springs typically exhibit a greater independence as the various pocketed coils are generally loosely connected by using a fabric pocket that is welded and glued together. Nevertheless, open coil springs remain significantly more economical to produce and are thus often regarded as more desirable from a production standpoint. Accordingly, a coil spring assembly design that uses open coil springs, but yet performs in the same manner as a pocketed coil spring would be both highly desirable and beneficial.

The information included in this Background section of the specification, including any references cited herein and any description or discussion thereof, is included for technical reference purposes only and is not to be regarded subject matter by which the scope of the invention is to be bound.

SUMMARY

According to some object and/or embodiments, an open coil spring assembly may comprise a plurality of rows of open coil springs arranged to form a matrix of the open coil springs, each of the open coil springs including an upper end convolution and a lower end convolution, and, an elastic lacing extending between pairs of adjacent rows of the plurality of rows of open coil springs, the elastic lacing attached to the upper end convolution of each of the open coil springs in one of the plurality of rows of open coils springs and to the upper end convolution of each open coil spring in an adjacent one of the plurality of rows of open coil springs.

According to some optional embodiments any of the following may be used with the first embodiment either alone or in any of various combinations. The elastic lacing may comprise a shock cord. The upper end convolution of each open coil spring may include a notch for attaching the upper end convolution of each open coil spring to the elastic lacing. The open coil spring may further comprise a clip for attaching the upper end convolution of each open coil spring to the elastic lacing. The open coil spring assembly may further comprise a helical wire extending between each of the plurality of rows of open coil springs, wherein the helical wire may be attached to the lower end convolution of each of the open coil springs in one of the plurality of rows of open coil springs and to the lower end convolution of each open coil spring in an adjacent one of the plurality of rows of open coil springs. Each of the open coil springs in one of the plurality of rows of open coils springs may be offset from each of the open coil springs in an adjacent one of the plurality of rows of open coil springs. The elastic lacing may comprise a wire having a first portion including a plurality of helical convolutions attached to each of the open coil springs in a respective one of the plurality of rows of open coils springs, and a second portion including a plurality of helical convolutions extending between each of the open coil springs in the respective one of the plurality of rows of open coil springs. The plurality of helical convolutions in the first portion may define a first pitch between each of the plurality of helical convolutions in the first portion, and further wherein the plurality of helical convolution in the second portion defines a second pitch between each of the plurality of helical convolutions in the second portion, and wherein the first pitch is greater than the second pitch. The open coil spring assembly may further comprise an additional wire extending between each of the plurality of rows of open coil springs, the additional wire may be attached to the lower end convolution of each of the open coil springs in one of the plurality of rows of open coil springs and to the lower end convolution of each coil spring in an adjacent one of the plurality of rows of open coil springs, the additional wire may have a first portion including a plurality of helical convolutions attached to each of the open coil springs in a respective one of the plurality of rows of open coils springs, and a second portion including a plurality of helical convolutions extending between each of the open coil springs in the respective one of the plurality of rows of open coil springs. The plurality of helical convolutions in the first portion of the additional wire define a first pitch between each of the plurality of helical convolutions in the first portion of the additional wire. Further, the plurality of helical convolutions in the second portion of the additional wire define a second pitch between each of the plurality of helical convolutions in the second portion of the additional wire. The first pitch may be defined by the plurality of helical convolutions in the first portion of the additional wire is greater than the second pitch defined by the plurality of helical convolutions in the second portion of the additional wire. The clastic lacing may comprises a plurality of discrete flexible bands, and wherein the upper end convolution of each of the open coil springs in the one of the plurality of rows of open coil springs is attached to the upper end convolution of each of the open coil springs in the adjacent one of the plurality of rows of open coil springs by one of the plurality of discrete flexible bands. The open coil spring assembly may further comprise a discrete flexible band connecting the upper end convolution of each open coil spring in a respective one of the rows of open coils springs to the upper end convolution of an adjacent open coil spring in the respective row. The open coil spring assembly may further comprising an additional plurality of discrete flexible bands, and wherein the lower end convolution of each of the open coil springs in the one of the plurality of rows of open coil springs is attached to the lower end convolution of each of the open coil springs in the adjacent one of the plurality of rows of open coil springs by one of the additional plurality of discrete flexible bands. The open coil spring assembly may further comprise a discrete flexible band connecting the lower end convolution of each open coil spring in a respective one of the rows of open coils springs to the lower end convolution of an adjacent open coil spring in the respective row. The open coil spring assembly may further comprising a damper extending through said springs at a position between the lower end convolution and the upper end convolution. The open coil spring assembly wherein the damper is arranged horizontally and engages a plurality of springs in one of a direction of a row or perpendicular to a row. The damper can also be is arranged vertically within the matrix and extends through at least one of the coil springs or be spaced from the coil springs.

The open coil spring assembly may further comprise two clastic lacings between each of the adjacent rows of the plurality of springs. The two clastic lacings between each of the adjacent rows may have one of parallel paths or serpentine paths. The elastic lacings may extend in a single direction. The elastic lacings may extend in two directions. The elastic lacings may be disposed at an angle to the plurality of rows of open coil springs. The elastic lacing may extend through a vertical dimension. The elastic lacing may compress at least some of the open coil springs of each of the plurality of rows. The open coil springs are multistage springs having a first portion with a first pitch and a second portion with a second pitch. The open coil spring may further comprise the second spring portion disposed above the first portion of the coil spring. The second spring portion may have at least one of a differing shape or pitch. The elastic lacing is disposed near a bottom of the second spring portion. The coil spring assembly may further comprise a foam layer disposed over the second spring portion. The foam may have a cut out to receive the second spring portion. The elastic lacing may be disposed at a top of the second spring portion. The open end coil springs may have at least two pitches. The upper end convolution of the open end coil springs may differ in shape than convolutions below the upper end convolution. The upper end convolution may be of a generally polygonal shape. The upper end convolutions may comprise wings. The upper end convolution bends downward toward an adjacent convolution. The coil spring assembly may further comprise clips which may connect one or more open end coils and which may extend in one or more directions.

According to another embodiment, an open coil spring assembly may comprise a plurality of open coil springs arranged to form a matrix of open coil springs, the matrix of open coils springs including a plurality of rows of open coils springs and a plurality of columns of open coil springs, each of the open coil springs including an upper end convolution and a lower end convolution, a first metal strip extending along and attached to the upper end convolution of each of the open coil springs in a respective one of the rows of open coils springs, the first metal strip including a V-shaped flexure extending between each of the open coil springs in the respective one of the rows of open coils springs, and, a second metal strip extending in a direction perpendicular to the first metal strip and attached to the lower end convolution of each of the open coil springs in a respective one of the columns of open coils springs, the second metal strip including a V-shaped flexure extending between each of the open coil springs in the respective one of the columns of open coils springs.

According to a further embodiment an open coil spring assembly may comprise a first plurality of open coil springs arranged in a first row, a second plurality of open coil springs arranged in a second row, which is parallel to the first row, each spring of the first and second plurality of open coil springs having at least one an integrally formed connector extending to another of the springs, and, the integral connectors providing a pivoting connection between adjacent open coil springs of the plurality of open coil springs of the first row and the second row.

Optionally, in combination with the previous embodiment, either alone or in combination, the following may be utilized. The open coil springs may have an upper convolution having a first bar and a second bar. The first bar and the second bar may have cooperating shapes which may interlace. The first bar of one of the adjacent springs interlacing with the second bar of said adjacent springs.

All of the above outlined features are to be understood as exemplary only and many more features and objectives of an open coil spring assembly may be gleaned from the disclosure herein. Therefore, no limiting interpretation of this summary is to be understood without further reading of the entire specification, claims and drawings, included herewith

BRIEF DESCRIPTION OF THE DRAWINGS

In order that the embodiments may be better understood, embodiments of the open coil spring assembly will now be described by way of examples. These embodiments are not to limit the scope of the claims as other embodiments of the open coil spring assembly will become apparent to one having ordinary skill in the art upon reading the instant description. Non-limiting examples of the present embodiments are shown in figures wherein

DESCRIPTION OF EXEMPLARY EMBODIMENTS

Figure 1A:
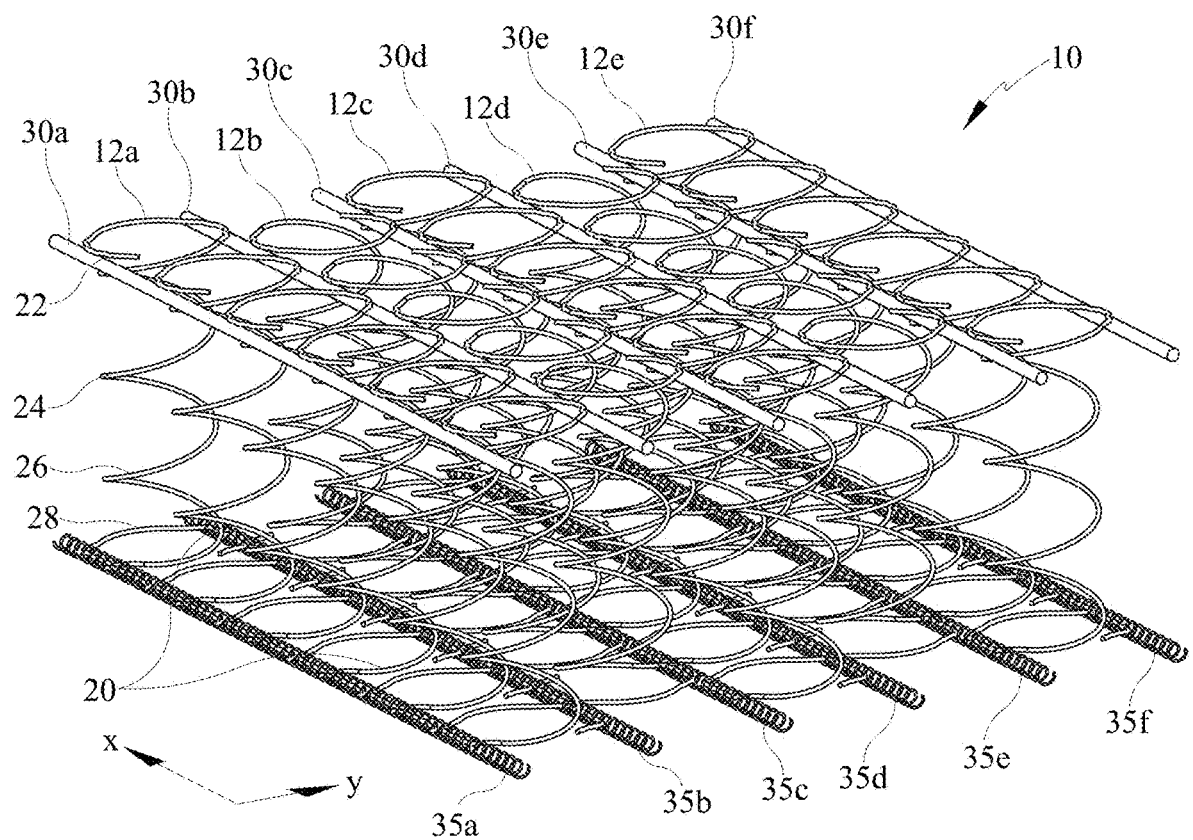
FIG. 1A is a perspective view of an open coil spring assembly made in accordance with the present invention.

It is to be understood that the open coil spring assembly is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present embodiments comprise open coil spring assemblies for support cushions, such as mattresses. In particular, the present embodiments comprise open coil spring assemblies that make use of an elastic lacing or other connecting methods, which may be of various forms, to join together a plurality of open coil springs in a manner that reduces motion transfer and bounce across the plurality of open coil springs and allows each of the open coil springs to move more independently of one another. Thus, in some embodiments, the open coil spring assemblies of the present invention replaces the top helical lacing wire found in conventional open coil spring assemblies and replaces that top helical lacing wire with an elastic lacing, elastic connection or other connecting methods, which may be of various forms embodied herein. By adding elasticity to the lacing or by using alternative connecting methods, the individual coils in an exemplary open coil spring assembly become more independent from one another and behave in manner similar to that observed in pocketed coil spring assemblies. Other embodiments maintain a helical lacing but provide alternate structures to achieve the above referenced functional improvements.

These improvements may relate to, but are not limited to, variations of springs or alternative attachment methods joining coils other than traditional lacing methods, aligning or offsetting of the springs in one or more dimensions or rows, pre-loading of springs, joining of springs and/or the elastic lacing and other embodiments provided herein or variations thereof.

Figure 1B:
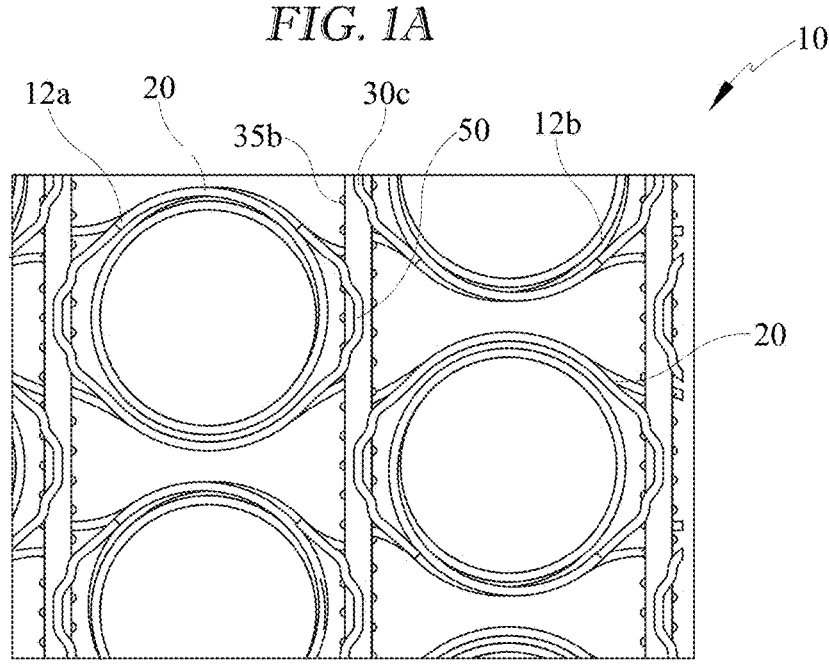
FIG. 1B is a partial top view of the open coil spring assembly of FIG. 1A.
Figure 1C:
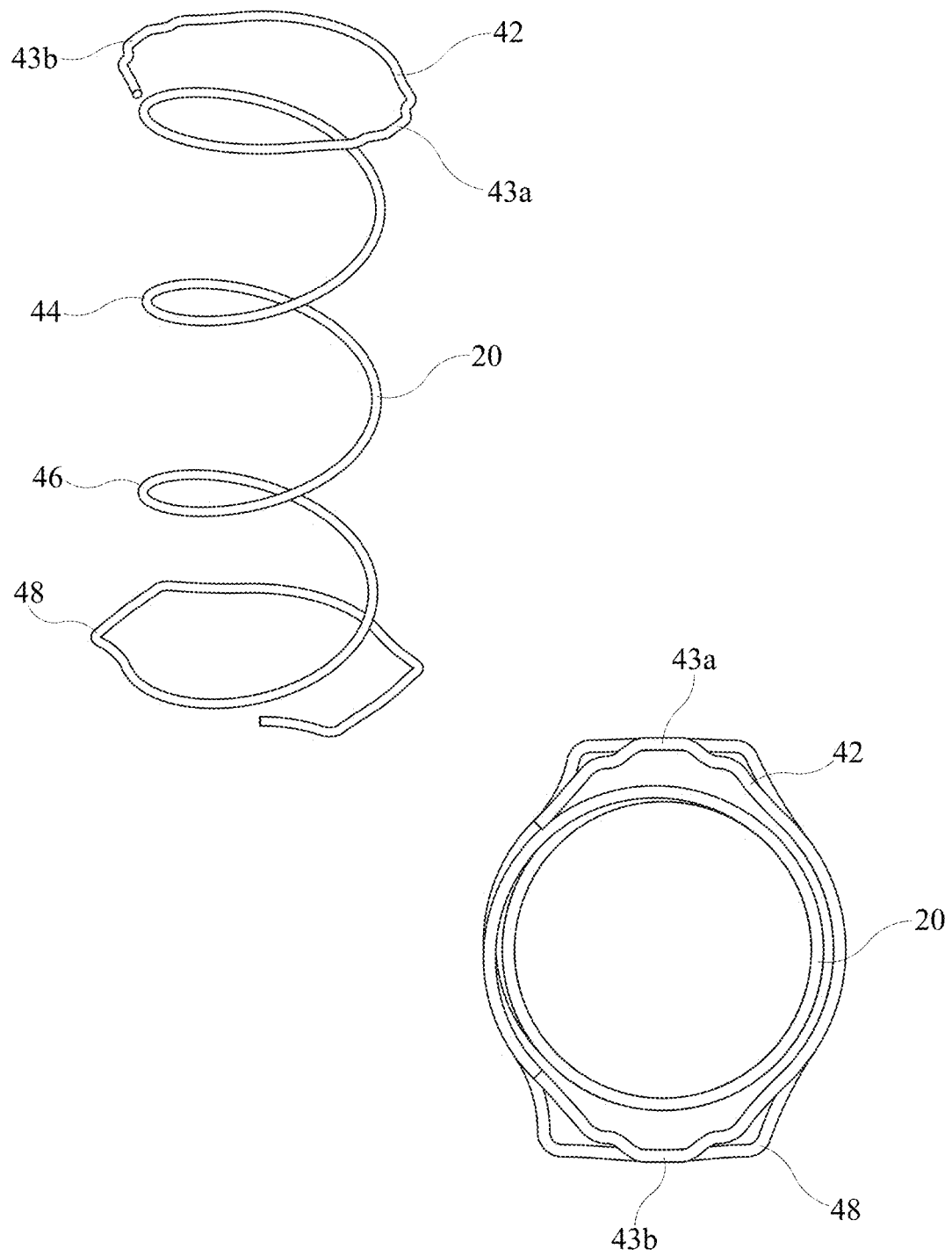
FIG. 1C is a side view and a top view of an open coil spring utilized in the open coil spring assembly of FIG. 1A.

Referring first to FIGS. 1A-1C, in one exemplary embodiment of the present invention, an open coil spring assembly 10 is provided that comprises a plurality of rows 12a, 12b, 12c, 12d, 12e of open coil springs 20 that are arranged to form a matrix. The plurality of rows may be defined in a single dimension, such as the X-dimension, the Y-dimension, or may also be defined in both of the X, Y dimensions. Further, the X-dimension and Y-dimension may be either of the head-to-toe direction of the bed or the side-to-side direction of the bed, for example. The number of rows may vary depending on a desired assembly size. Each of the open coil springs 20 included in the open coil spring assembly 10 has an upper end convolution 22, a lower end convolution 28, and a plurality of helical convolutions 24, 26 that extend between the upper end convolution 22 and the lower end convolution 28 of each open coil spring 20. Segments of elastic lacing 30a, 30b, 30c, 30d, 30e, 30f are further included in the exemplary open coil spring assembly 10 and extend between each of the plurality of rows 12a, 12b, 12c, 12d, 12e of open coil springs 20. More specifically, each segment of elastic lacing 30a, 30b, 30c, 30d, 30e, 30f is attached to the upper end convolution 22 of each of the open coil springs 20 in one of the plurality of rows 12a, 12b, 12c, 12d, 12e of open coil springs 20 and to the upper end convolution 22 of each open coil spring 20 in an adjacent one of the plurality of rows 12a, 12b, 12c, 12d, 12e of open coil springs 20, as perhaps shown best by the two rows 12a, 12b of open coil springs 20 connected by the elastic lacing 30c illustrated in FIG. 1B.

With further respect to the exemplary open coil springs 20 included in the open coil spring assembly 10, each open coil spring 20 is generally a five and one-half turn spring with three and one-half active turns as the added half turn is believed to allow each open coil spring 10 to remain more upright and to also allow each open coil spring 20 to be easily attached to one of the segments of elastic lacing 30a, 30b, 30c, 30d, 30e, 30f. Moreover, the diameter of each of the open coil springs 20 shown in FIGS. 1A-1C generally has a diameter of about two inches that expands to two and one-half inches at both the upper end convolution 22 and the lower end convolution 28 to impart additional vertical stability to each of the open coil springs 20 and to allow each of the open coil springs 20 to remain more upright as lateral forces push against the top of each of the open coil springs 20. Of course, open coil springs have various other numbers of turns and diameters can also be produced, and can be selected for a particular application without departing from the spirit and scope of the present invention. With regard to the sizes of upper end convolution 22 and the lower end convolutions 28 of the coil spring 20, where the diameter, or distance across if not circular, at the top 22 of the spring 20 and the bottom 28 of the spring differ, the greater the difference between diameters at the top and bottom may provide greater stretching length for lacing, and therefore more compliance. Alternatively, where the diameters are the same or closer in measurement, this design may decrease the amount of compliance, if desirable. In some embodiments, the springs 20 may be conical in shape and in some other embodiments the spring may be cylindrical. However, still other shapes may be utilized with review of compliance and stability. Likewise, the cylindrical shape and the conical shape may be fully circular, or may be partially circular with sections of spring that are not circular, such as at the top convolution 22 and/or bottom convolution 28 of each spring. Various spring designs may be utilized and where a spring diameter decreases, the spring may be stiffened. Alternatively, where larger diameters are utilized, the spring may be softened.

To provide a point of attachment in the upper end convolution 22 of each open coil spring 20 for attaching each open coil spring 20 to one of the segments of elastic lacing 30a, 30b, 30c, 30d, 30e, 30f, each open coil spring 20 may also include a pair of notches 43a, 43b in the upper end convolution 22 of each open coil spring 20. Each of the notches 43a, 43b is essentially comprised of a flattened portion of the upper end convolution 22 of each open coil spring 20 that extends beyond the circumference of the upper end convolution 22 to not only provide a flattened point of attachment for a respective one of the segments of elastic lacing 30a, 30b, 30c, 30d, 30e, 30f, but to also, at least in part, ensure adequate spacing between neighboring open coil springs 20 and reduce noise caused by spring-to-spring contact. In the exemplary embodiment, to allow for such attachment and spacing, the width of each of the notches 43a, 43a is typically in the range of about ⅜ inches, but, again, such a dimension can readily be adapted for a specific spring or application as desired. Additionally, each of the notches 43a, 43b may be sized corresponding to a clip 50 size which is used to connect each spring to the elastic lacing 30 or to connect each spring to another spring. By sizing the notches 43a, 43b in such manner as to correspond to the size of a clip 50 (FIG. 1B), the movement of the spring relative to the clip 50, or vice-versa may be limited.

Turning now to the segments of elastic lacing 30a-30f included in the spring assemblies, various elastic materials including metals, alloys, rubber, latex, thermoplastic polyurethane, and the like can be used as all or part of an exemplary segment of elastic lacing. In the exemplary open coil spring assembly 10, the segments of elastic lacing 30a, 30b, 30c, 30d, 30e, 30f are comprised a shock cord. As such, each of the segments of elastic lacing 30a, 30b, 30c, 30d, 30e, 30f thus typically includes a protective outer nylon woven sheath that limits the amount of deflection of each of the segments of elastic lacing 30a, 30b, 30c, 30d, 30e, 30f and further includes an inner elastic portion, which is comprised of a durable latex or other comparable material, that is capable of withstanding little to no degradation in modulus after multiple cycles.

The elastic lacing or elastic connections as described in the instant application may take various forms. For example, with respect to the segments of elastic lacing 30a, 30b, 30c, 30d, 30e, 30f included in the open coil spring assembly 10, and without wishing to be bound by any particular theory or mechanism, it is believed that, in certain embodiments, a balance of wire diameter (gauge) and diameter of the segments of elastic lacing 30a, 30b, 30c, 30d, 30e, 30f (e.g., the shock cord or bungee cord, for example) can be taken into consideration to both decrease motion transfer and bounce, such as what may occur if the ratio becomes too low (i.e. with a larger shock cord) and the stiffness of the assembly increases, and to prevent the spring from bottoming out and having an unstable surface, such as what may occur if the ratio is too high. In this regard, in the exemplary open coil spring assembly 10, each of the open coil springs 20 is formed from a continuous wire having a diameter of 0.083 inches and segments of elastic lacing 30a, 30b, 30c, 30d, 30e, 30f (i.e., segments of shock cord) having a diameter of 0.25 inches, such that the ratio of wire diameter (gauge) and diameter of the segments of elastic lacing 30a, 30b, 30c, 30d, 30e, 30f in the open coil spring assembly 10 is 0.332. Shock cord may be similar to bungee-cord-like material in some embodiments, but may be formed of various materials which provide flexibility and elasticity including, but not limited to, latex, polyurethane elastomer, plastics, rubbers, metals, alloys and/or combinations of any of such or other materials as well, all of which may be utilized. Further however, as will be shown in other embodiments, the elastic lacing may take other forms which provide a steadying connection between the coil springs of the assembly, either directly or indirectly.

To attach the segments of elastic lacing 30a, 30b, 30c, 30d, 30e, 30f to the upper end convolutions 22 of each of the open coil springs 20, the open coil spring assembly 10 further includes a plurality of clips 50. Each of the clips 50 is typically in the form of a three-eighths (⅜") of an inch brass or other materials for crimping, which allows the clips 50 to be soft enough to easily crimp around a respective one of the notches 43a, 43b in each upper end convolution 22 of each of the open coil springs 20 and a respective one of the segments of elastic lacing 30a, 30b, 30c, 30d, 30e, 30f, but also allows each of the clips to provide enough compressive force to not allow the segments of elastic lacing 30a, 30b, 30c, 30d, 30e, 30f to slip along the upper end convolutions 22 of each of the open coil springs 20. In this regard, each of the segments of elastic lacing 30a, 30b, 30c, 30d, 30e, 30f is generally attached to the upper end convolution 22 of each of the open coil springs 20 below the upper surface of the springs to prevent each of the segments of elastic lacing 30a, 30b, 30c, 30d, 30e, 30f from working itself under one of the open coil springs 20 as it is being compressed downward. The elastic lacings 30a-30f may further comprise a preselected shape at locations where the notches are located to engage the notches 43a, 43b and aid in retention of the open coil springs 20 in position relative to the elastic lacings 30a-30f.

Referring still to FIGS. 1A-1C, to attach the lower end convolutions 28 of the open coil springs 20 together, the open coil spring assembly 10 further comprising a plurality of lower helical lacing wires 35a, 35b, 35c, 35d, 35e, 35f that also extend between each of the plurality of rows 12a, 12b, 12c, 12d, 12e, 12f of open coil springs 20. Each of the lower helical wires 35a, 35b, 35c, 35d, 35e, 35f are attached to the lower end convolution 28 of each of the open coil springs 20 in a respective one of the plurality of rows 12a, 12b, 12c, 12d, 12e, 12f of open coil springs 20 and to the lower end convolution 28 of each open coil spring 20 in an adjacent one of the plurality of rows 12a, 12b, 12c, 12d, 12e, 12f of open coil springs 20. By including such lower helical lacing wires 35a, 35b, 35c, 35d, 35e, 35f in the open coil spring assembly 10, the lower helical lacing wires 35a, 35b, 35c, 35d, 35e serve to maintain the geometric shape of each open coil spring 20 and, in turn, the open coil spring assembly 10, as well as prevent the lower portion of each open coil spring 20 from moving independently.

In order for each of the open coil springs 20 to maintain independence from one another, each of the open coil springs 20 are also generally offset from one another such that the clips 50 alternate from side-to-side along the length of the segments of elastic lacing 30a, 30b, 30c, 30d, 30e, 30f. Offsetting each of the open coil springs 10 also provides for sufficient spacing between open coil springs 20 so as to minimize coil-to-coil collisions. In some embodiments, any instabilities of the individual open coil springs 20 may also be minimized further by rotating each row 12a, 12b, 12c, 12d, 12e, 12f of open coil springs 20 by, some amount, for example 180°. Such a rotation improves stability by cancelling any lean left in the spring geometry due to the forming process and by allowing any lean to be cancelled by virtue of coupling the lean with an opposing lean in the opposite direction. However, the matrix defined by the rows may provide a single row direction of spring alignment, and be offset in a second, perpendicular direction, or alternatively, may comprise the second, perpendicular rows be aligned. Thus row arrangement may be a single direction or two directions for any of the embodiments of the instant disclosure. Likewise, the spring rotation, for example about a vertical axis, may also be a design characteristic of any of the embodiments.

Figure 2A:
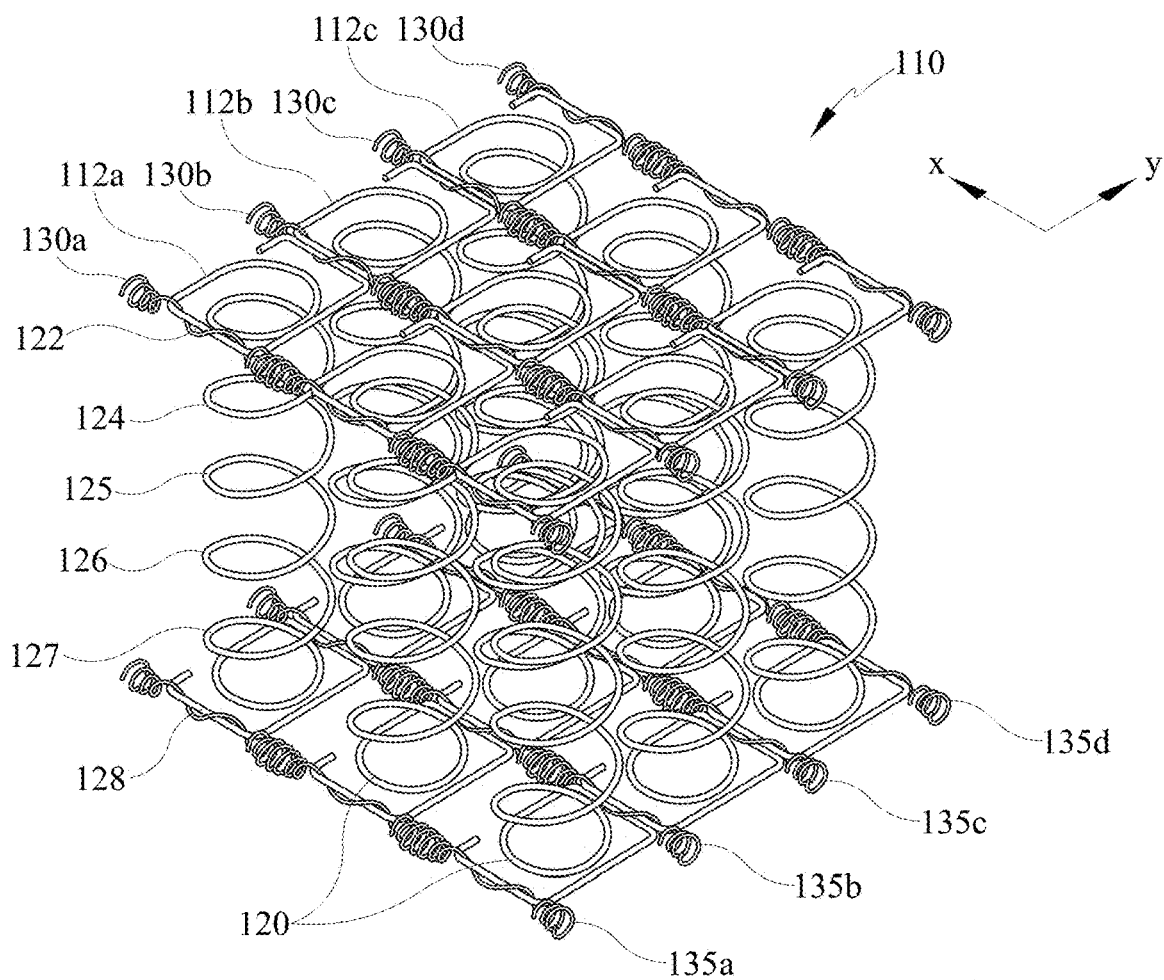
FIG. 2A is a perspective view of another open coil spring assembly made in accordance with the present invention.
Figure 2B:
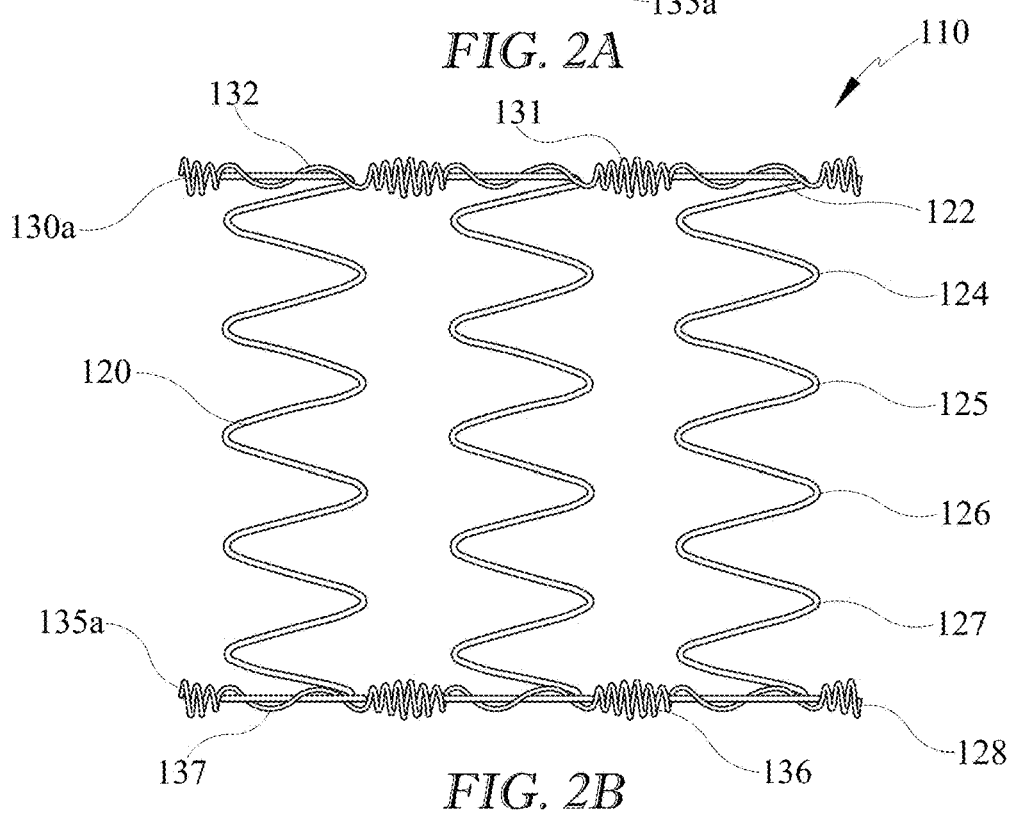
FIG. 2B is a side view of a row of open coil springs included in the open coil spring assembly of FIG. 2A.

As a refinement to the open coil spring assemblies of the present invention, various other configurations of an elastic lacing can also be used to allow the individual coils in an exemplary open coil spring assembly to move more independently from one another and behave in a manner similar to that observed in pocketed coil spring assemblies. For example, as a refinement and referring now to FIGS. 2A-2B, in another exemplary embodiment, an open coil spring assembly 110 is provided that, like the exemplary open coil spring assembly 10 shown in FIGS. 1A-1C, includes a plurality of rows 112a, 112b, 112c of open coil springs 120 that are arranged to form a matrix. In this embodiment the coil springs of an adjacent row, for example row 112b, may or may not be offset from row 112a in an X-direction, so that rows in a Y-direction may or may not be also defined. In the instant embodiment, the adjacent rows, for example 112b, are generally not offset in the X-direction. Each of the open coil springs 120 included in the open coil spring assembly 110 also similarly has an upper end convolution 122, a lower end convolution 128, and a plurality of helical convolutions 124, 125, 126, 127 that extend between the upper end convolution 122 and the lower end convolution 128 of each open coil spring 120. Unlike the open coil spring assembly 10 shown in FIGS. 1A-1C, however, the open coil spring assembly 110 does not make use of elastic lacing that is in the form of a shock cord. Rather, in the open coil spring assembly 110, the elastic lacing is comprised of a segments of wire 130a, 130b, 130c, 130d, with each of the segments of wire 130a, 130b, 130c, 130d having a first portion 132 including a plurality of helical convolutions attached to each of the open coil springs 120 in a respective one of the plurality of rows 112a, 112b, 112c of open coils springs 20, and a second portion 131 including a plurality of helical convolutions extending between each of the open coil springs 20 in the respective one of the plurality of rows 112a, 112b, 112c of open coil springs 120. In this regard, to provide independence between the open coil springs 120, the plurality of helical convolutions in the first portion 132 defines a first pitch between each of the plurality of helical convolutions in the first portion 132 that is different from the pitch of the second portion 131. For example, in some embodiments the pitch of first portion 132 may be greater than the pitch defined by and between the plurality of helical convolutions in the second portion 131, or vice versa. One of the first portion 132 and second portion 131 of convolutions may be used to capture or engage the coil springs 120, for example, the notches 43a, 43b of the coil springs 120. Additionally, by using such variable pitch, the spacing of the coil springs 120 of the open coil spring assembly 110 may also be controlled.

To further ensure that the each of the open coil springs 120 move more independently from one another in the open coil spring assembly 110, the open coil spring assembly 110 further comprises additional lower segments of wire 135a, 135b, 135c, 135d that extend between each of the plurality of rows 112a, 112b, 112c of open coil springs 20 and that are attached to the lower end convolution 128 of each of the open coil springs 120 in one of the plurality of rows 112a, 112b, 112c of open coil springs 120 and to the lower end convolution 128 of each open coil spring 120 in an adjacent one of the plurality of rows 112a, 112b, 112c of open coil springs 120. In particular, and similar to the segments of wire 130a, 130b, 130c, 130d attached to the upper end convolutions 122 of the open coil springs 120, the additional segments of wire 135a, 135b, 135c, 135d include a first portion 137 having a plurality of helical convolutions attached to each of the open coil springs 120 in a respective one of the plurality of rows 112a, 112b, 112c of open coils springs 120, and a second portion 136 including a plurality of helical convolutions extending between each of the open coil springs 120 in the respective one of the plurality of rows 112a, 112b, 112c of open coil springs 120, with the pitch defined by the convolutions in the first portion 137 being greater than that of the second portion 136.

Figure 3A:
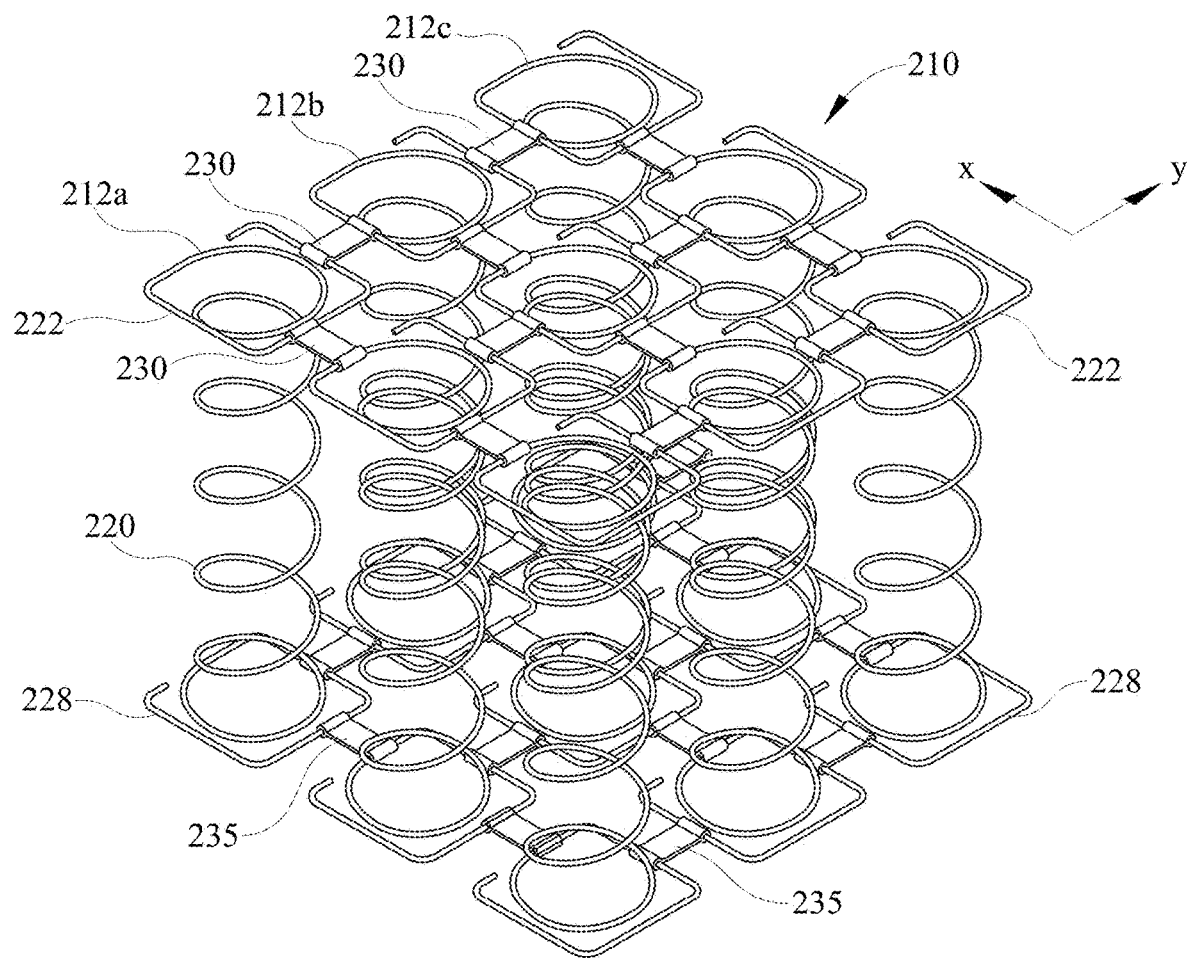
FIG. 3A is a perspective view of another open coil spring assembly made in accordance with the present invention.
Figure 3B:
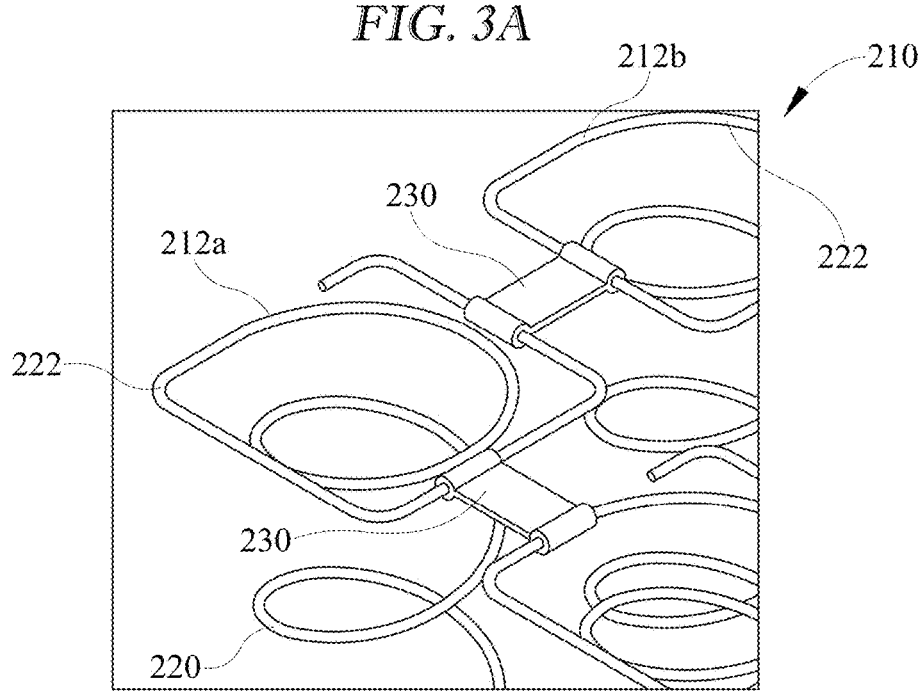
FIG. 3B is a partial perspective view of the open coil spring assembly of FIG. 3A.

As another refinement, in other embodiments of the open coil spring assemblies of the present invention, the helical wires that have conventionally connected the individual open coil springs in a traditional open coils spring assembly can also be replaced with individual flexible connectors, which can then stretch and bend to provide an additional layer of independence by allowing each open coil spring to move more freely, but yet still attaching each open coil spring to its neighbor. For instance, and referring now to FIGS. 3A-3B, in a further embodiment, an open coil spring assembly 210 is provided that includes a plurality of rows 212a, 212b, 212c of open coil springs 220 that are arranged to form a matrix. Each of the open coil springs 220 included in the open coil spring assembly 210 has an upper end convolution 222 and a lower end convolution 228. The open coil spring assembly 210 further includes an elastic lacing or connections in the form of a plurality of discrete flexible bands 230 that attach the upper end convolution 222 of each of the open coil springs 220 in one of the plurality of rows 212a, 212b, 212c of open coils springs 220 to the upper end convolution 222 of each of the open coil springs 220 in the adjacent one of the plurality of rows 212a, 212b, 212c of open coil springs 220. One of the plurality of discrete flexible bands 230 further connects the upper end convolution 222 of each open coil spring 220 in a respective one of the rows 212a, 212b, 212c of open coil springs 220 to the upper end convolution 222 of an adjacent open coil spring 220 in the same respective row 212a, 212b, 212c. Thus the bands 230 may extend in both the X and Y directions. An additional plurality of discrete flexible bands 235 then also connects the lower end convolution 228 of each of the open coil springs 220 in the same manner. The bands 230 may include ends which are sized to engage, for example receive, end convolutions 222 and a central portion which extends between the ends. In the non-limiting embodiment, the ends may be circular in cross-section with a hollow area to receive the convolution ends. In this embodiment, the flexible bands 230 allow for normal deflection of the coil springs 220, up to a certain amount of deflection. Then, the flexible bands 230 limit deflection beyond the threshold amount.

Figure 4:
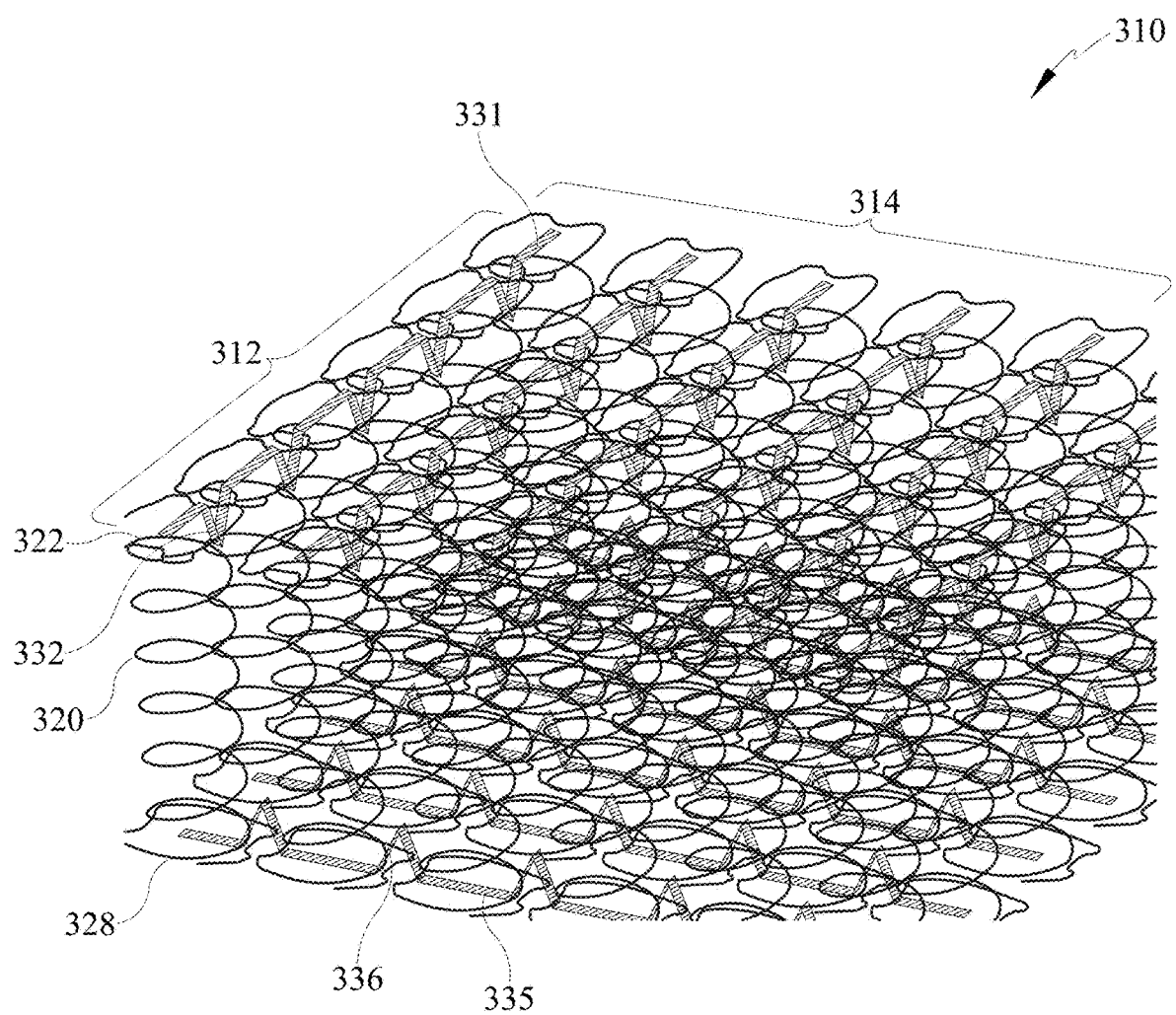
FIG. 4 is a perspective view of another open coil spring assembly embodiment.

As an even further refinement, in further embodiments of the present invention, open coil spring assemblies are also provided that make use of metal strips including flexures that provide a hinge-like flexing motion between open coil springs to give more independence to each open coil spring. As one example of such an embodiment, and referring now to FIG. 4, an exemplary open coil spring assembly 310 is provided that includes a plurality of open coil springs 320 arranged to form a matrix. The matrix of open coil springs 320 includes a plurality of rows 312 of the open coils springs 320 as well as a plurality of columns 314 of the open coil springs 320. A plurality of first metal strips 331 are further included and extend along and are attached to the upper end convolution 322 of each of the open coil springs 320 in a respective one of the rows 312 of the open coil springs 320. Each of the first metal strips 331 includes a V-shaped flexure 332 that extends between each of the open coil springs 320 in the respective one of the rows 312 of open coil springs 320 to give more independence to each open coil spring 320. A second metal strip 335 is also included and has a plurality of V-shaped flexures 336. The second metal strip 335 extends in a direction perpendicular to the first metal strip 331 and is attached to the lower end convolution 328 of each of the open coil springs 320 in a respective one of the columns 314 of open coil springs 320 with each of the V-shaped flexures 336 extending between each of the open coil springs 320 in the respective one of the columns 314 of open coil springs 320.

In alternative embodiments, variations of the previously described embodiments and features may be utilized. For example, the coil springs according to some embodiments may be some shape other than helical. According to some other embodiments, where a clip structure is utilized, a layer of foam or rubber may be utilized about the clip end of the springs, or alternatively the entire spring may be coated with the foam or rubber. The foam or rubber layer may not only protect in the areas of clipping, but may also provide desired damping for the coil springs. Further, the sizes of the springs may vary. For example, the spring size may be large enough that elastic lacing is not required, but instead the springs engage one another. Still further the coil spring may comprise coil in coil designs according to some embodiments. Likewise, any of the previously described features may be formed of a variety of materials in order to vary the performance characteristics of the assembly.

Figure 5:
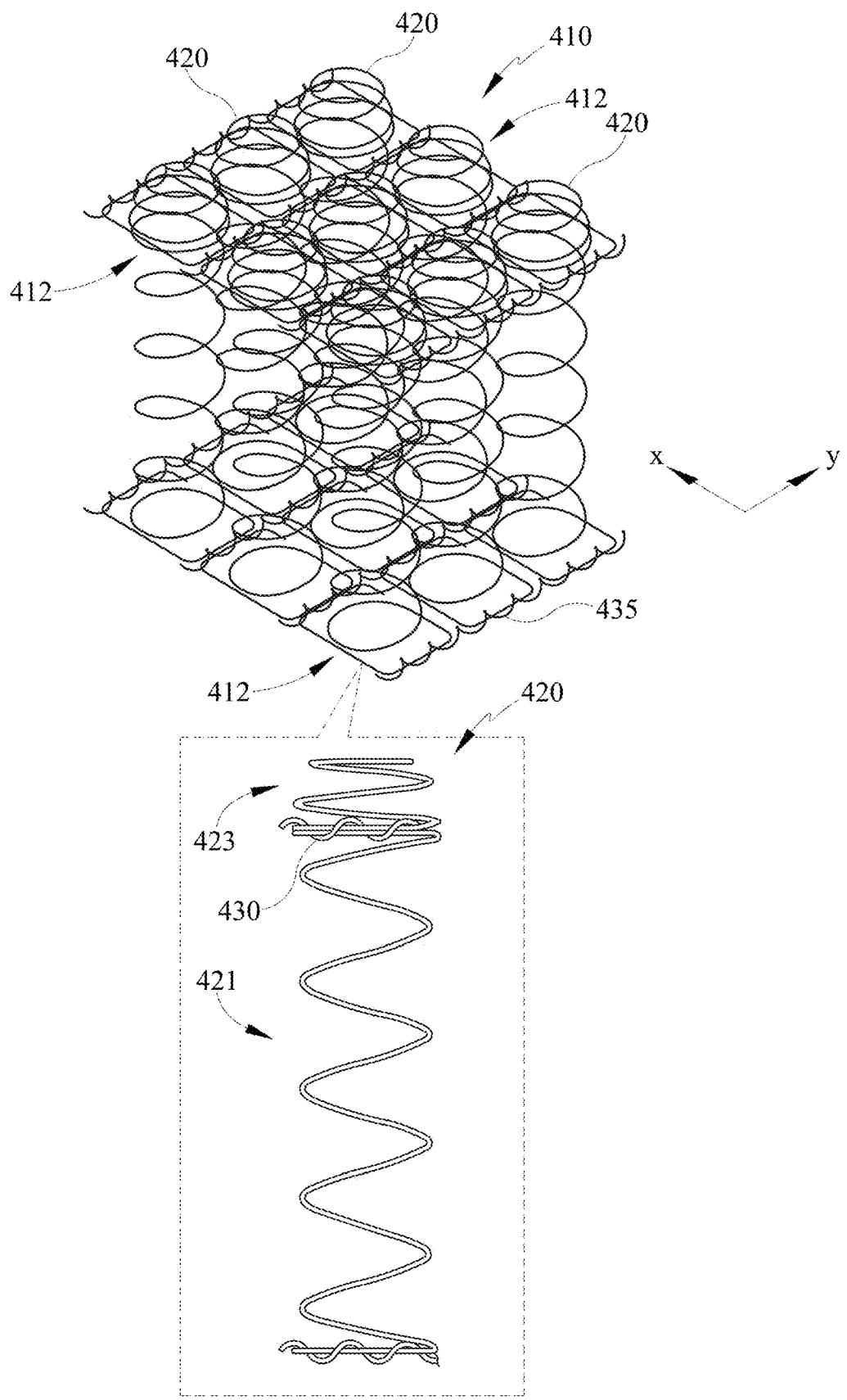
FIG. 5 is a perspective view of another assembly embodiment with an exploded detail of an illustrative spring of the assembly.

With reference now to FIG. 5, a further spring embodiment is provided which improves compliance and motion transfer performance. In this view a perspective view of an assembly 410 is provided with an exploded detail view. The assembly 410 is defined by a plurality of rows 412 which may be defined in either or both of the X and Y directions.

In the instant embodiment, each of the coil springs 420 may be a multi-stage spring with a first helical pitch and a second helical pitch. The coil spring 420 has a first helical portion 421, for example a lower portion with the first helical pitch and a second, upper helical portion 423 with the second helical pitch. Likewise, it should be understood that the first portion may be the upper portion and the second portion may be the lower portion. The first and second pitches may be different to provide different performance in different stages of compression. Additionally, the upper spring may be of the same diameter or size as the lower spring, or may be of a different size. In the instant embodiment, the upper helical portion 423 may be frusto-conical in shape to change from a larger lower diameter to a smaller upper diameter.

An elastic or wire lacing 430 may be disposed at a lower end of the upper helical 423, or alternatively the upper end of the lower helical 421. In this embodiment wherein the spring 420 is formed of two portions, the lacing 430, wire or elastic, is not at the top of the spring. Instead the lacing 430, wire or elastic, is disposed between the upper and lower portions 423, 421. A lower lacing wire 435 may also be utilized which may be of a known type of stiff wire lacing or may of an elastic lacing as previously described. The upper lacing 430 may run in the same direction as the lower lacing wire 435, as depicted in some embodiments, or may run in perpendicular directions from one another. Still further, the lacing 430 may be disposed at the upper end of upper portion 423 as described later and the lacings may run in a single direction or more than one direction, and may be aligned or angled relative to the rows.

Still further, it is shown in this embodiment that where the elastic lacing is moved downward from the top of the coil spring, the upper end of the spring is free to move.

Figures 6, 6A:
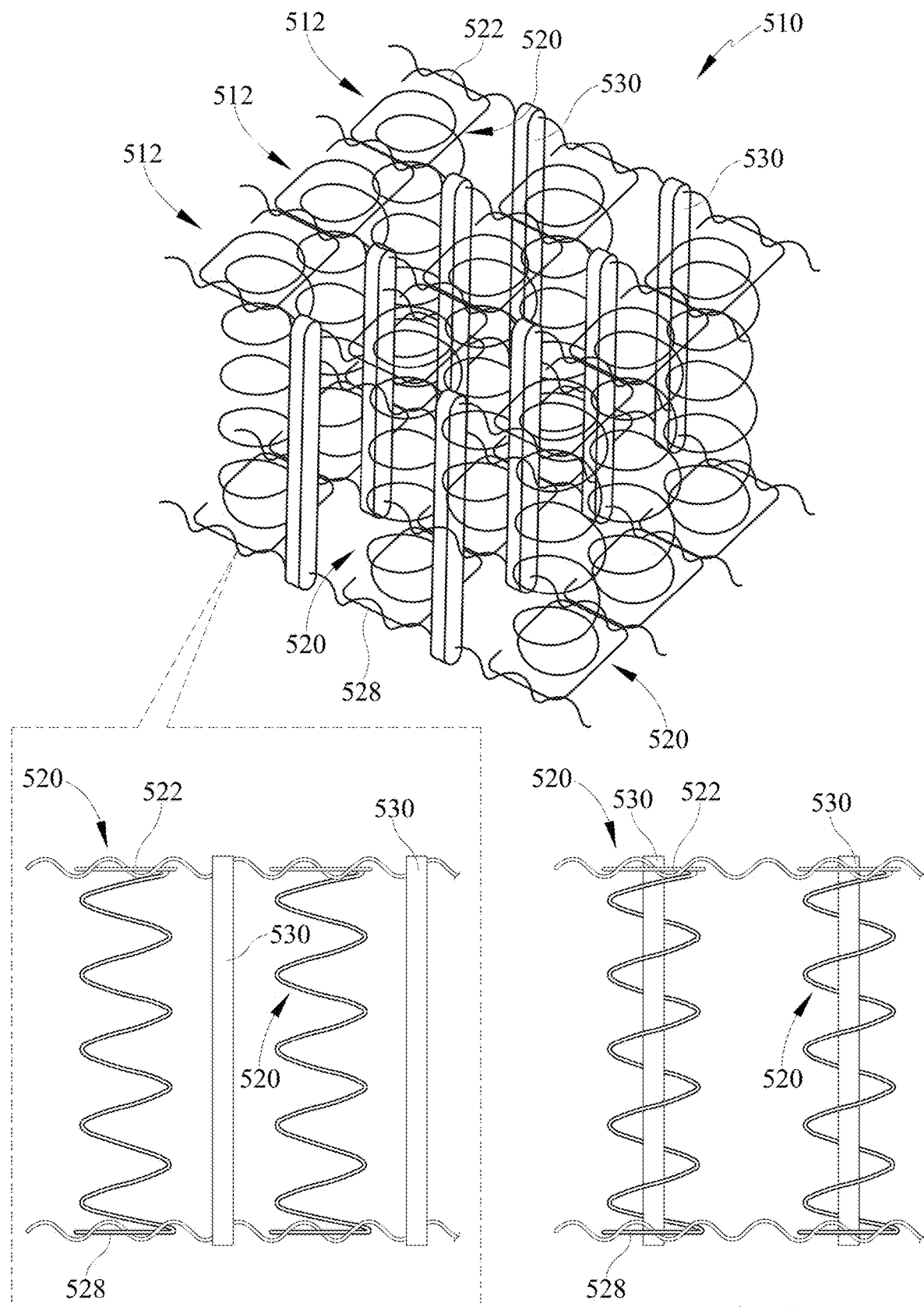
FIG. 6 is a perspective view of another open coil spring assembly embodiment with an exploded detail view of a portion of the assembly.
FIG. 6A is a detail view of an alternate embodiment wherein the damper extends through the open end coil spring.

Referring now to FIG. 6, a further embodiment is provided. An innerspring assembly 510 is provided again by rows 512 of springs 520 wherein the rows in one or two, X and Y dimensions, depending on whether a spring offset is desired for performance characteristics. In his embodiment, the elastic lacings may be defined by a plurality of straps or dampers 530 which are provided in the assembly. In some embodiments, the straps 530 may be provided within the coil envelope or in other embodiments, the straps 530 may be provided outside the coil envelope. Also a combination of such arrangements may be utilized.

The straps 530 extend generally in a vertical direction between the lacing of the rows 512, or between spring connections at the upper end convolutions 522 and the lower end convolutions 528. The straps 530 may be formed of flexible materials, such as for non-limiting example, rubber, shock-cord or like material, polyurethane, or other flexible materials, or combinations of materials. In this way, the coil springs 520 are connected in some fashion to the lacing, which may be of a similar type as is known in the art, or may be of the elastic lacing type described in various embodiments of the instant application. The straps 530 may be used to pre-load the coil springs 520 or to stretch the springs depending on a length used or further, alone or in combination, preload a lacing at top or bottom of the assembly 510. All of this is, again, to improve compliance while reducing bounce, which is common to open coil springs.

With reference to FIG. 6A, the dampers 530 are shown alternatively extending vertically through the springs 520. The dampers may be connected to the wire, to the open coil springs 520 or both.

Figure 7:
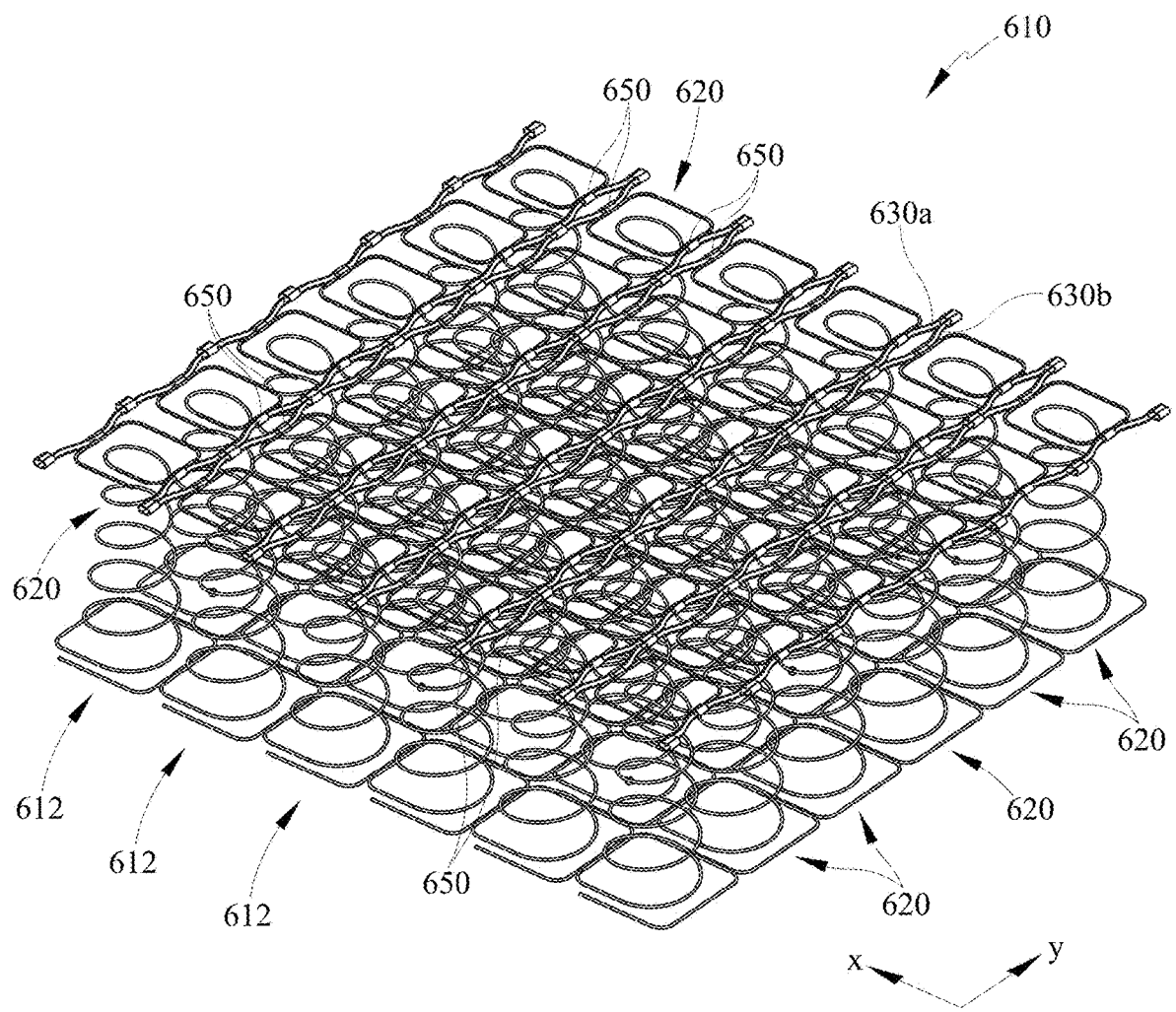
FIG. 7 is a perspective view of another assembly embodiment having multiple elastic lacings between rows.

Referring now to FIG. 7, a further embodiment of an assembly is shown in perspective view wherein the elastic lacing is varied. In this embodiment, an assembly 610 is provided as in earlier embodiments by a plurality of rows 612 of springs which may be aligned in one or both of the head-to-toe direction and the side-to-side direction.

Figure 7A:
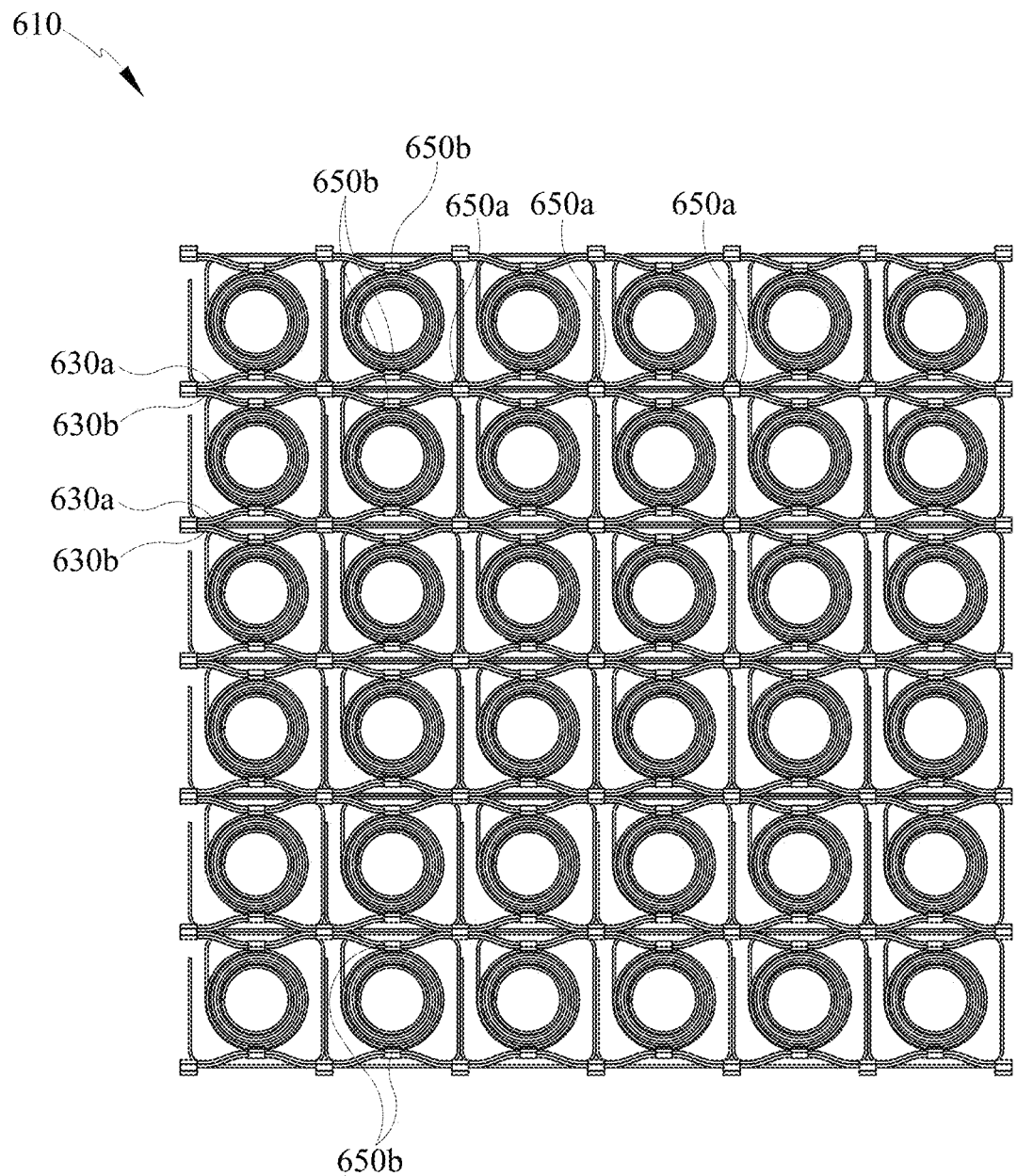
FIG. 7A is a top view of the embodiment of FIG. 7 further depicting the elastic lacings.

According to the top view of FIG. 7A, and in combination with FIG. 7, there are two elastic lacings 630*a*, 630*b* between each row of springs. In the instant embodiment, the spring assembly 610 is arranged with rows 612 formed in two directions since the springs 620 are aligned rather than offset. In this embodiment, the elastic lacings 630*a*, 630*b* are connected by clips 650*a* at locations between the rows (as best shown in FIG. 7A) and are each connected to the springs 620 as designated by 650*b*, for example along a centerlines of the springs 620. In this arrangement, the elastic lacings 630*a*, 630*b* may spread apart to connect to the spring coils 620, but are clipped together between rows. Thus, the lacings 630*a*, 630*b* have a serpentine shape.

Figure 7B:
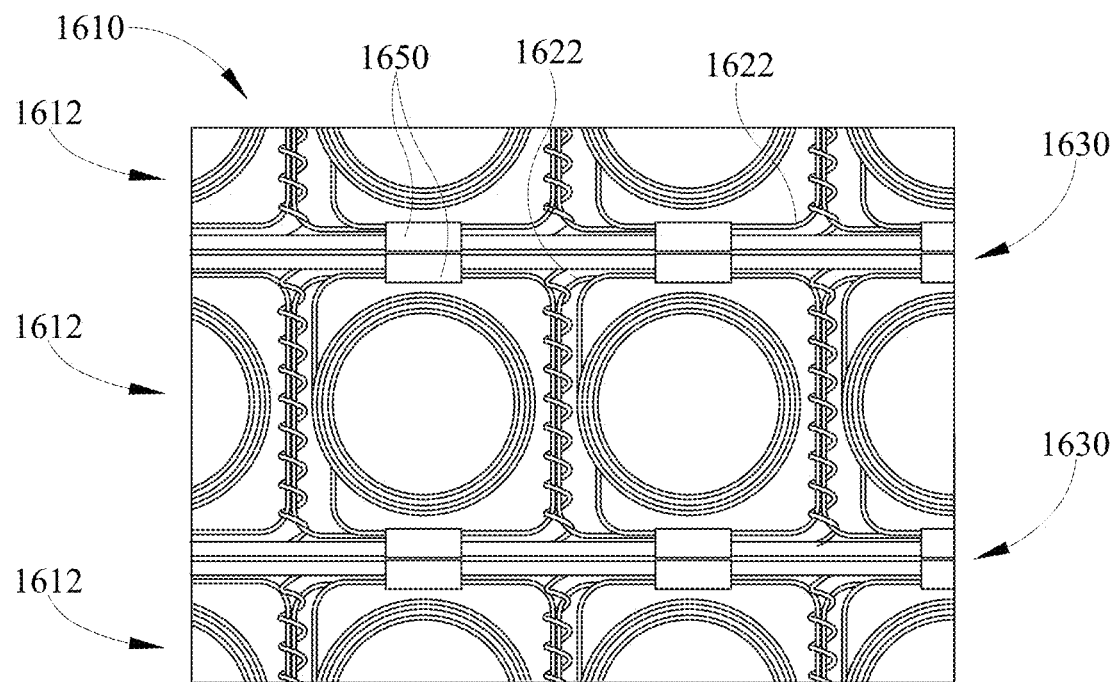
FIG. 7B is a top view of an further alternate arrangement of the multiple elastic lacing embodiment.

With reference to FIG. 7B, a further alternative embodiment is provided. In other embodiments, the elastic lacings 1630 are arranged two between each row 1612 of springs 1620. The lacings 1630 may extend straight, parallel to one another between each row 1612, without moving away from one another and toward one another in the serpentine pattern. In this embodiment, the spring convolutions 1622 may be varied in order to allow the parallel elastic lacings between springs to continue in such straight manner. In this embodiment, where the elastic lacings 1630 are straight, the assembly 1610 may have more stability from side-to-side. In the depicted embodiment of assembly 610 where the elastic lacing 630 is somewhat serpentine, the assembly of springs 620 and lacings 630 may be have more compliance and generally more support.

In these embodiments, the clips 650, 1650 may be aligned in a single direction according to some embodiments, which is coaxial with the direction that the elastic lacings 630, 1630 extends. Still further, it may be that elastic lacings 630, 1630 may also extend in a perpendicular direction to that which is shown, or both directions. Thus in some embodiments, the clips 650, 1650 may extend in same or different directions within an assembly.

Figure 7C:
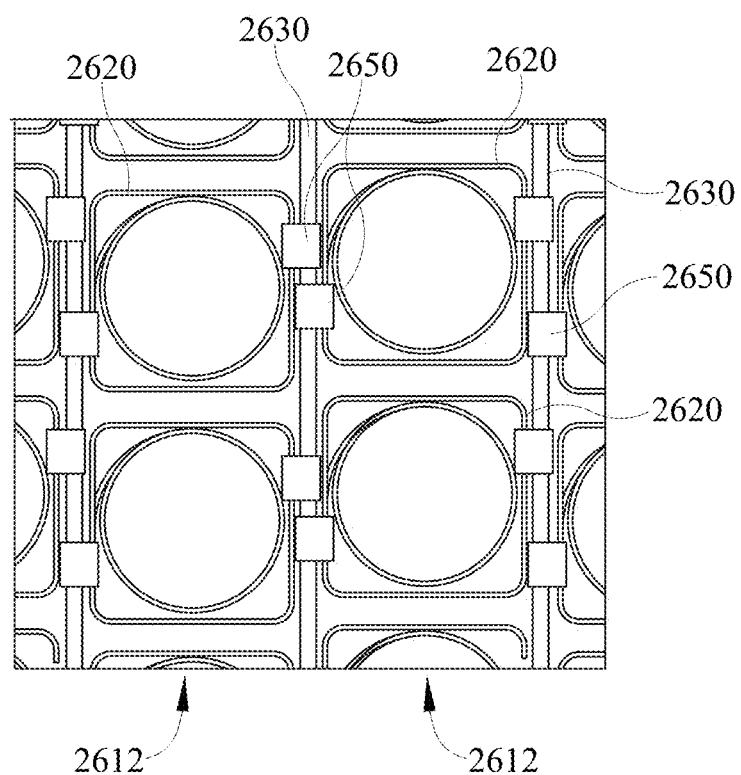
FIG. 7C is a top view of still a further arrangement of springs and elastic lacing of an alternate embodiment.

Still further, and with reference to FIG. 7C, in some embodiments, a single elastic lacing 2630 may be utilized between each row 2612 of the coil springs 2620, as opposed to two elastic lacings between rows. In the depicted embodiment, the rows 2612 of springs 2620 may be formed between the elastic lacings 2630. Accordingly, each side of a spring 2620 may be clipped to one elastic lacing 2630.

With reference still to FIG. 7C, the embodiment provides that rows extend in a single direction but the coil springs are offset, rather than aligned, in a second direction. In this embodiment, a single elastic lacing 2630 is utilized and one clip 2650 per spring may be utilized to connect the coils to the elastic lacings. As compared to the embodiments of FIG. 1A-1C, for example the clips 2650 of any single spring 2620 may be offset, rather than aligned, across any spring 2620. Further, wherein the coil springs 2620 are shown having circular convolutions, the embodiments may alternately have a plurality of shapes which may be consistent or may vary at the upper and lower end convolutions.

Figure 8:
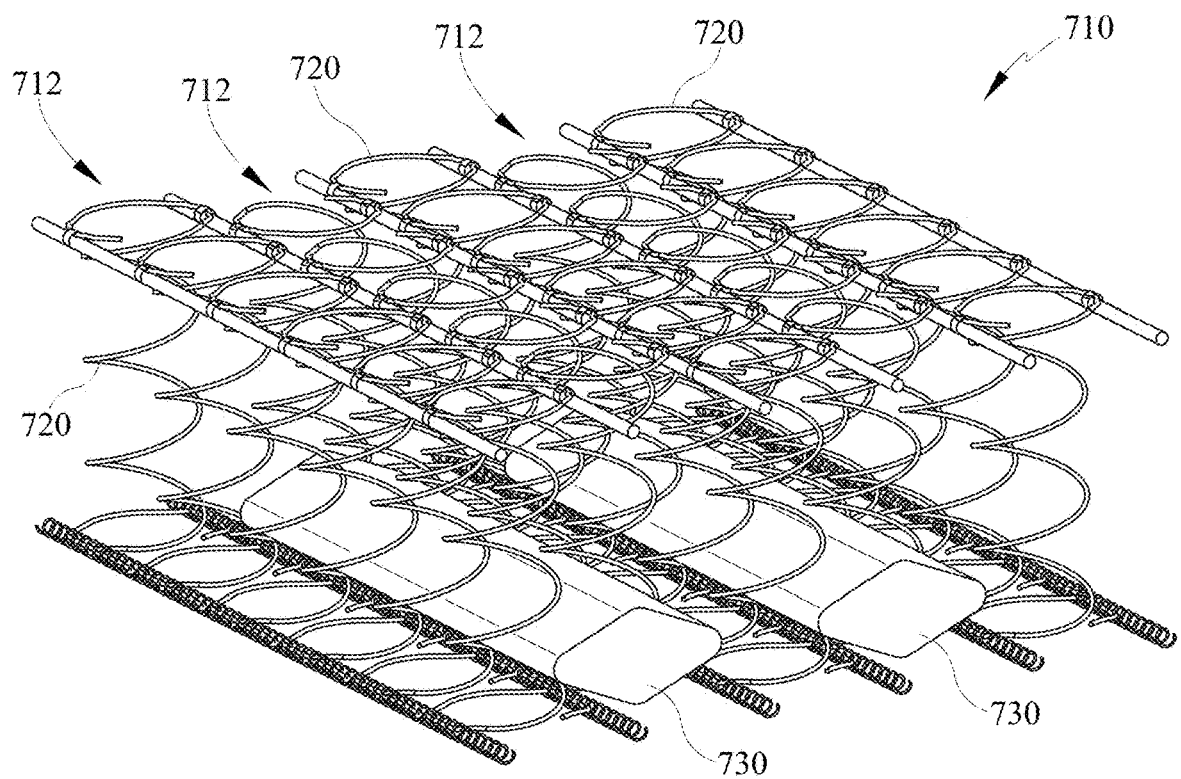
FIGS. 8 and 8A include a perspective view and a side view of an open coil spring assembly having dampers disposed through the spring matrix.
Figure 8A:
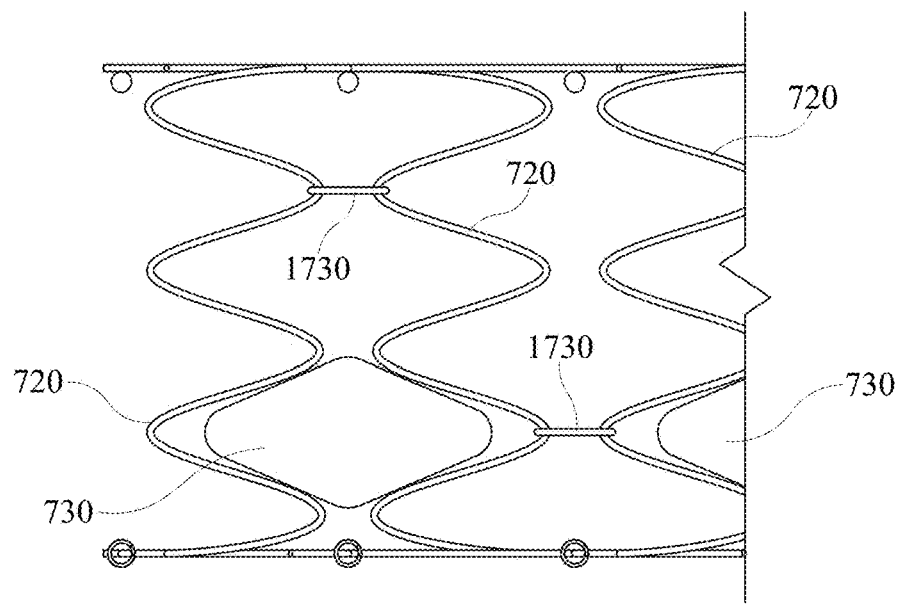

According to still a further embodiment, and with reference to FIG. 8 and FIG. 8*a*, a plurality of springs 720 defining assembly 710 may further comprise dampers or stabilizers 730 which extend substantially horizontally. For example, the embodiment is provided having a plurality of rows of coil springs defined in one direction or two directions, to define an assembly 710. Extending through the rows 712 of coil springs 720 may be the damper 730 to provide lateral stability, reduce bounce and reduce motion transfer. In the instant embodiment, the damper 730 may be formed of polyethylene or polyurethane, but this is not a limiting embodiment, as other materials may be utilized. Further, the damper 730 may be positioned at various heights of the coil spring 720. In some embodiments, the damper 730 may be placed lower in the spring height, in order to improve lateral stability at the base of the springs. However, the damper 730 may also be positioned higher in the spring depending on the desired result and for example, where the additional stability is needed.

The geometry of the dampers 730 may also vary. It may be desirable that the dampers 730 fit between adjacent springs 720, along a line between rows 712 for example. The damper 730 for example may be shaped to extend further radially into the convolutions of the matrix assembly. Accordingly, the shape of the damper 730 may be somewhat dependent upon the diameter of the coil springs 720 and the radius of the coil curvature.

In further optional embodiments, an alternative damper or stabilizer may be utilized. As shown in FIG. 8*a*, the coils of adjacent rows may be connected by an elastic connector 1730 toward lower ends of the springs 720, or any height of the springs 720. The connectors 1730 may be at the same elevations or may be at different elevations. These elastic connectors 1730 at lower elevations of the springs 720 may also aid with stability of the spring bases. Further, the elastic connectors 1730 may be used with or without the dampers 730.

Figure 9:
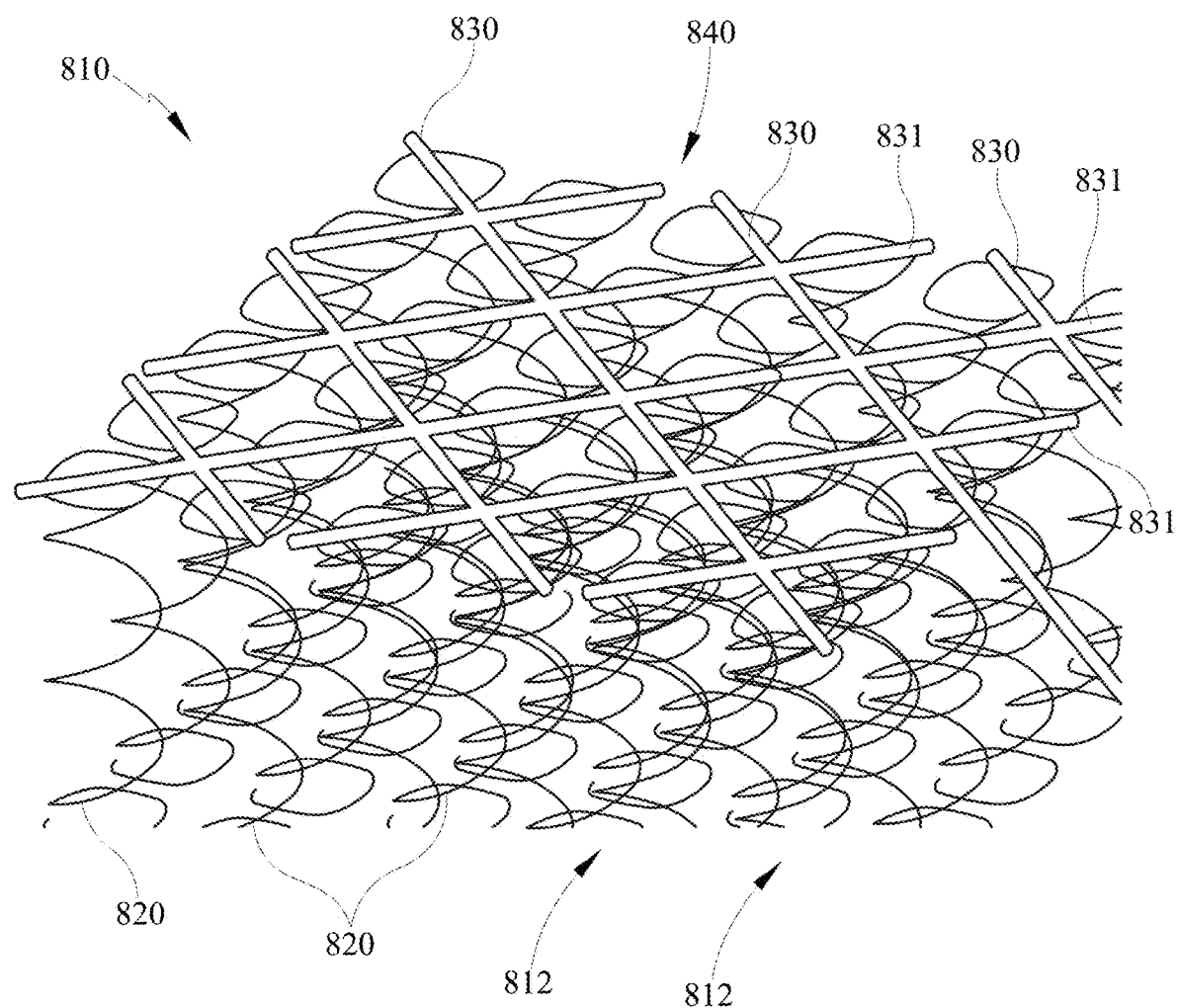
FIG. 9 is a perspective view of an illustrative open coil spring assembly having alternate arrangement of elastic lacing.

Referring now to further embodiments shown in the perspective view of FIG. 9, an assembly 810 is depicted having a plurality of elastic lacings 830. In this embodiment, the lacings 830 extend in two directions to define a net 840. As previously discussed, the lacings may extend in a direction of the rows of coil springs. However, additionally, the lacings may extend in a perpendicular direction to the first direction of lacing.

Further, as shown in the depicted embodiment, the first direction of the lacing 830 may be at an angle to the rows 812 of coil springs 820. However, the lacings 831 may also in a second perpendicular direction. In the instant embodiment the lacings 830, 831 are extending at 45 degrees to the rows and perpendicular to one another. The lacings may be clipped to the coil springs 820 as in previous embodiments and such may be provided with upper end convolutions at locations adjacent to the elastic lacings 830, 831.

Figure 10:
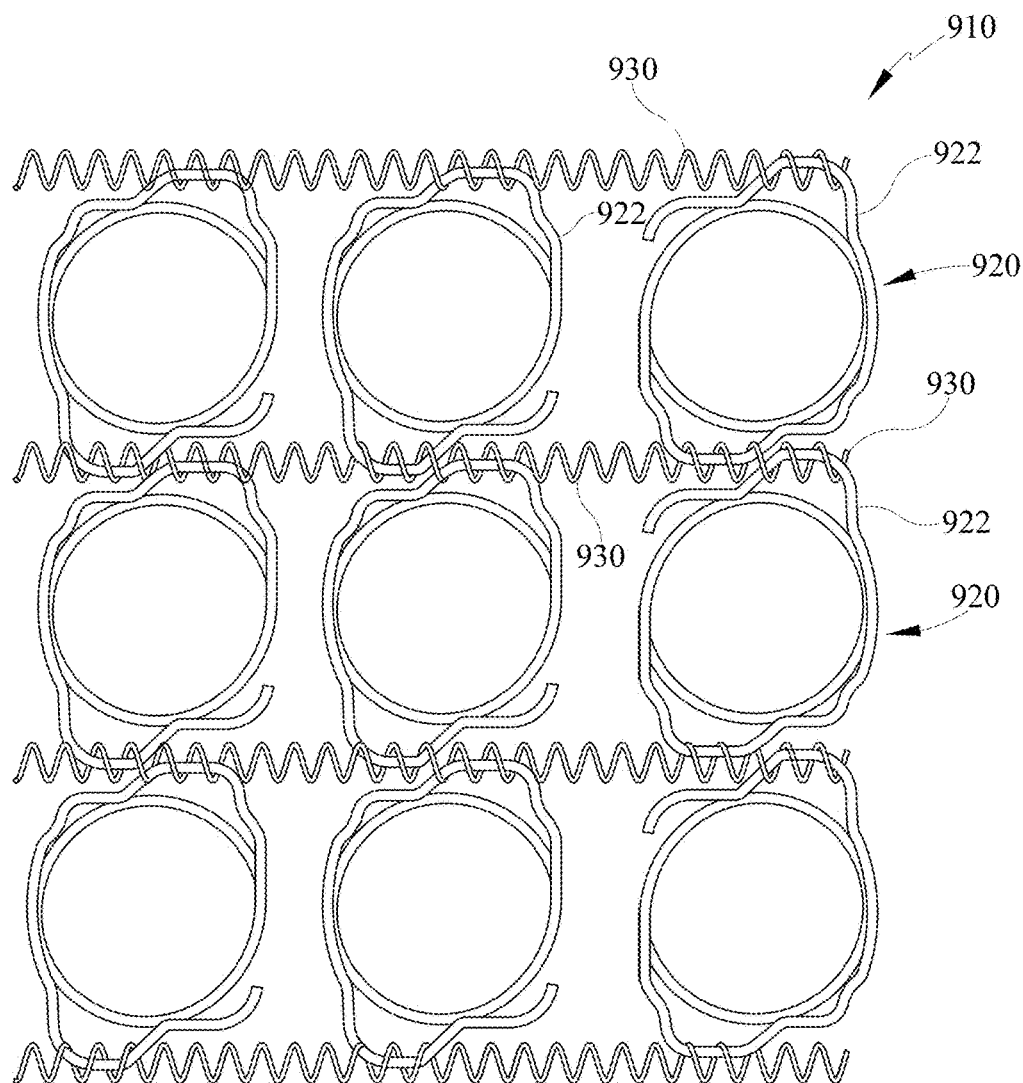
FIGS. 10-10A show various embodiments of bar-to-bar configurations of the open coil spring assembly which allow for hinging between adjacent coils.
Figure 10A:
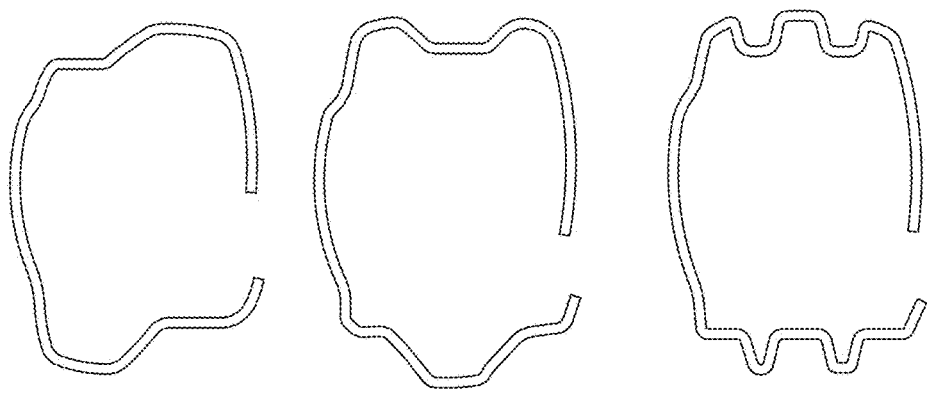

With reference not to FIG. 10, a further embodiment is provided wherein a bar-to-bar connection is made in which spring coils are abutting or nearly abutting one another, at upper convolutions or alternatively are axially aligned to allow hinging or pivoting between adjacent springs. In such embodiment, a lacing 38 may be utilized and the lacing may be helical for non-limiting example. The lacing 38 may receive upper convolutions 922 portions of adjacent springs in the axial direction of, and within, the helical. With this co-axial arrangement of adjacent springs in the helical lacing, the adjacent spring may form a hinge in combination with the helical lacing. With additional reference to FIG. 10A, in some embodiments, the spring upper end convolutions 922 may have shapes that cooperate or interlace with the upper convolutions of an adjacent spring. For example, in various profiles of FIG. 10A, the upper most bar of each spring depicted convolution has a shape which cooperates with the lower bar shape of the convolution. When two springs are positioned adjacent to one another, these top bars will cooperate or interlace with the lower bar of the adjacent spring, or vice-versa, so that the lacing will connect to adjacent springs but allow them to pivot relative to one another. Otherwise stated, the shapes of the adjacent spring bars to not hinder or interfere with hinging action. These shapes of FIG. 10A are exemplary but not limiting as other shapes or profiles may be utilized. Thus portions of the cooperating shapes may both be engaged in a coaxial manner for example, by the helical lacing.

Figure 11:
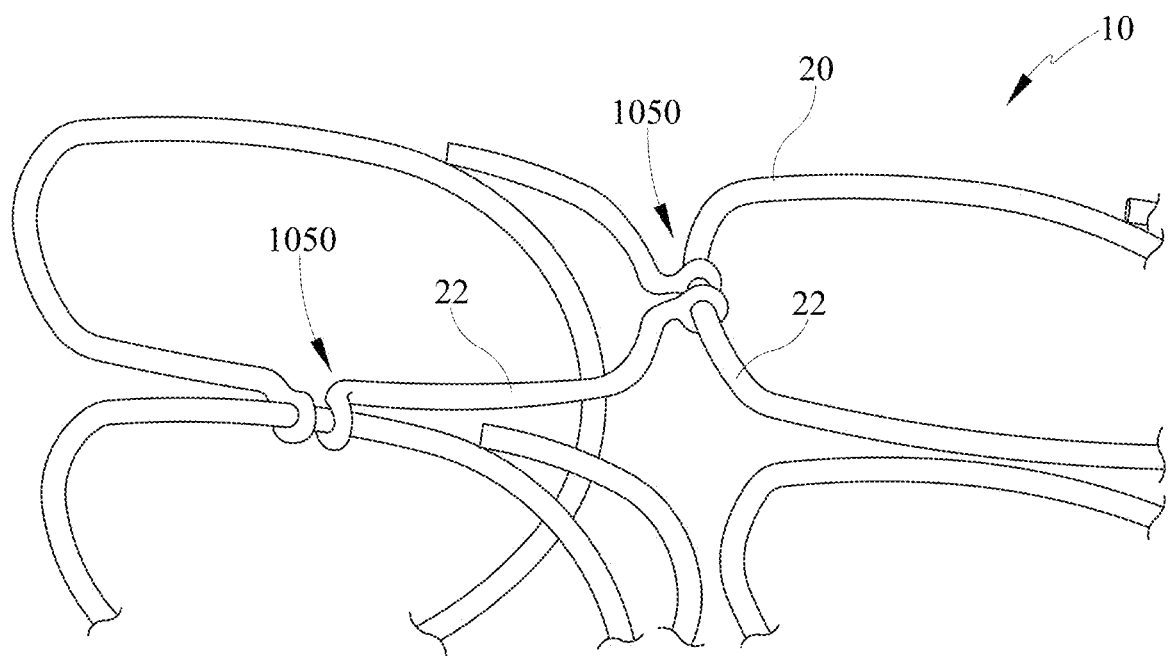
FIG. 11 is an alternate embodiment of a bar-to-bar configuration of springs which allows interconnection of the springs and hinging therebetween.

With reference to FIG. 11, a further embodiment of a bar-to-bar arrangement may also be provided. In this embodiment, the lacing nor any distinct external clip structures are utilized. In this embodiment an illustrative assembly 10 is shown which may be representative of any of the embodiments in the disclosure, including any coil spring, generally shown as spring 20. Further, according to the embodiment, the upper convolutions 22 of the coil spring 20 are formed with any of various shapes such as circular, or semi-circular, shapes which cooperate together. In this embodiment, the upper convolution 22 of one spring may have at least one clip 1050 integrally formed thereon to receive the coil 22 of an adjacent spring 20. In the instant embodiment, one coil spring may have two integral clips 1050 formed in the coil. These may be oriented generally along sides that are perpendicular to one another, as shown, or along opposite sides of the spring 20. The bar-to-bar configuration again allows connection of springs to one another, rather than an elastic lacing, and pivoting or hinging of the adjacent springs. This embodiment however does not require the helical lacing and also does not require additional, distinct mechanical clips once the springs are interconnected and defining the assembly.

With regard to the elastic lacing or elastic connections of the various embodiments of the disclosure, at least some of these structures may be formed of the elastic, deformable and/or otherwise bendable materials. In some embodiments, the various embodiments of the elastic lacing or connections may in some embodiments be formed of materials which add friction and thereby improve damping. For example, in some embodiments the elastic lacing may be layered cables or cords having multiple layers or sheaths. Alternatively, or in addition, the cables or cords may be formed of two or more woven cables. In still further embodiments, the cables may be braided material. According to some embodiments, braided materials whether circular or flat in cross-section may be used. Likewise, these embodiments may be combined in a variety of manners. The elastic lacing cables may alternatively be formed of visco-elastic materials.

Figure 12:
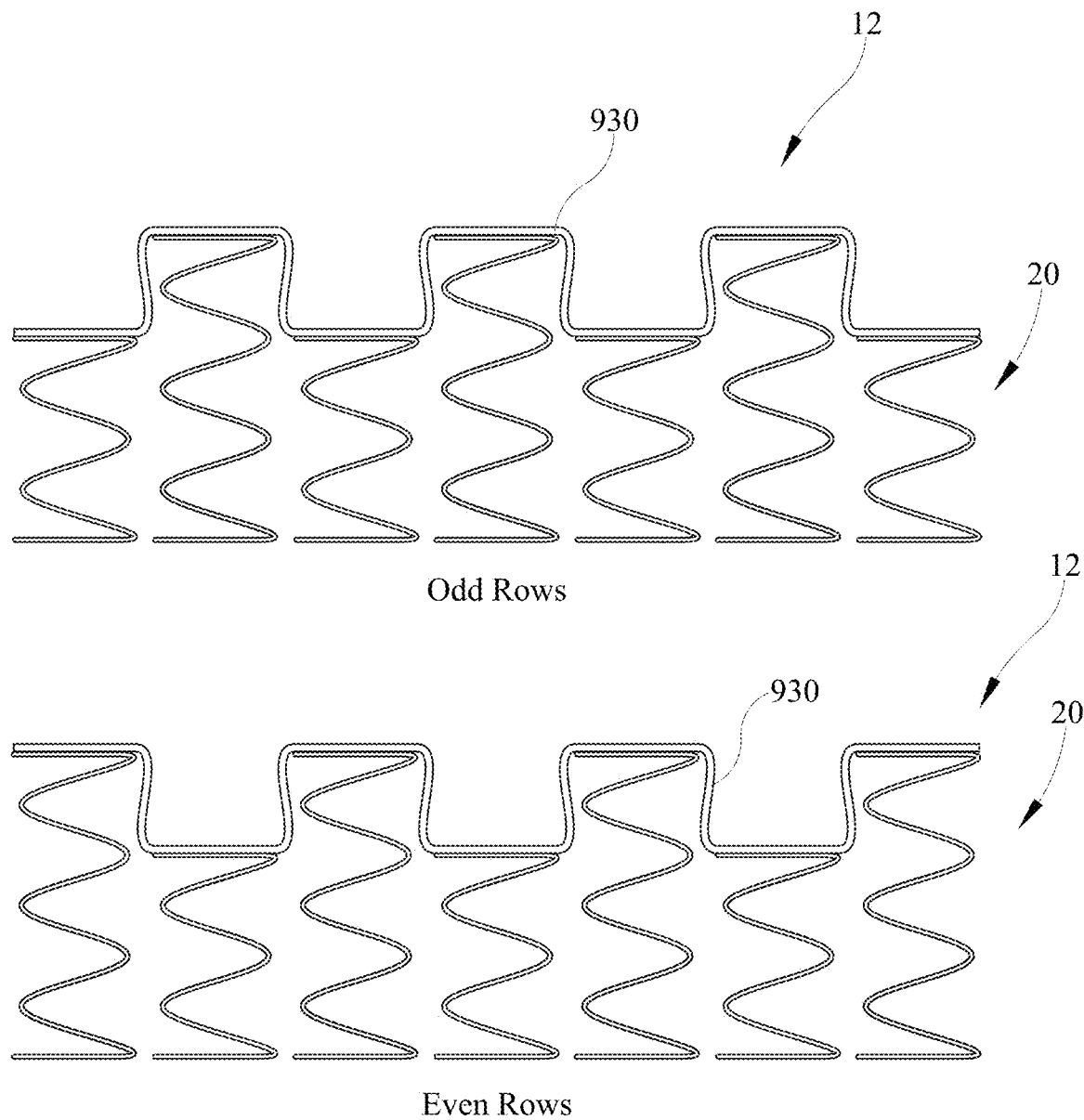
FIG. 12 is a side view of two alternate rows of springs which may be utilized with an elastic lacing which varies the height of springs in each row.

With reference now to FIG. 12, a further embodiment for spatial separation of the springs is shown. In the depicted embodiment, additionally, the structure may provide some pre-loading of the springs, for example springs 20. According to some embodiments, an elastic lacing 930 may be used which compresses or extends certain springs 20. The embodiment provides that the assembly, for non-limiting example assembly 10 may therefore have springs 20 of differing height. In one non-limiting embodiment, the elastic lacing 930 in one row 12 depresses every other spring within a row. When two rows 12 are assembled together, the depressed springs 20 may be disposed in every other position in a cross-wise, or perpendicular direction to the row direction as well. In this embodiment, the elastic lacing 930 will have some resistance to the depressed springs in order to retain such depressive force on the springs of lower height. Alternatively, or additionally, some attachment structures, for non-limiting example, clips or elastic connectors, may be used to connect the lacing 930 to the springs 20. While portions of the lacing 930 are shown extending vertically, it may that these portions are instead angled relative to the vertical or alternatively, where clips are used, the vertical portions of the elastic lacing 930 may remain more vertically oriented as depicted. Various materials may be used for the lacing 930 to provide this depressed state of preselected springs.

Another feature of the instant embodiment, as referred to briefly, is that the lacing 930 has portion which extend through a vertical plane. Most of the previous embodiments have extended primarily through a horizontal plane. The instant embodiments extends through both a horizontal and vertical plane in providing the compression force to the springs 20. By passing through a vertical plane, and connecting the lacing 930 to the springs 20, the lacing 930 may for example, pull upwardly on the short springs and pull downwardly on the longer springs. Alternatively, the vertical portions of the lacing 930 may be stiffened so to apply compression force rather than tension.

Figure 13:
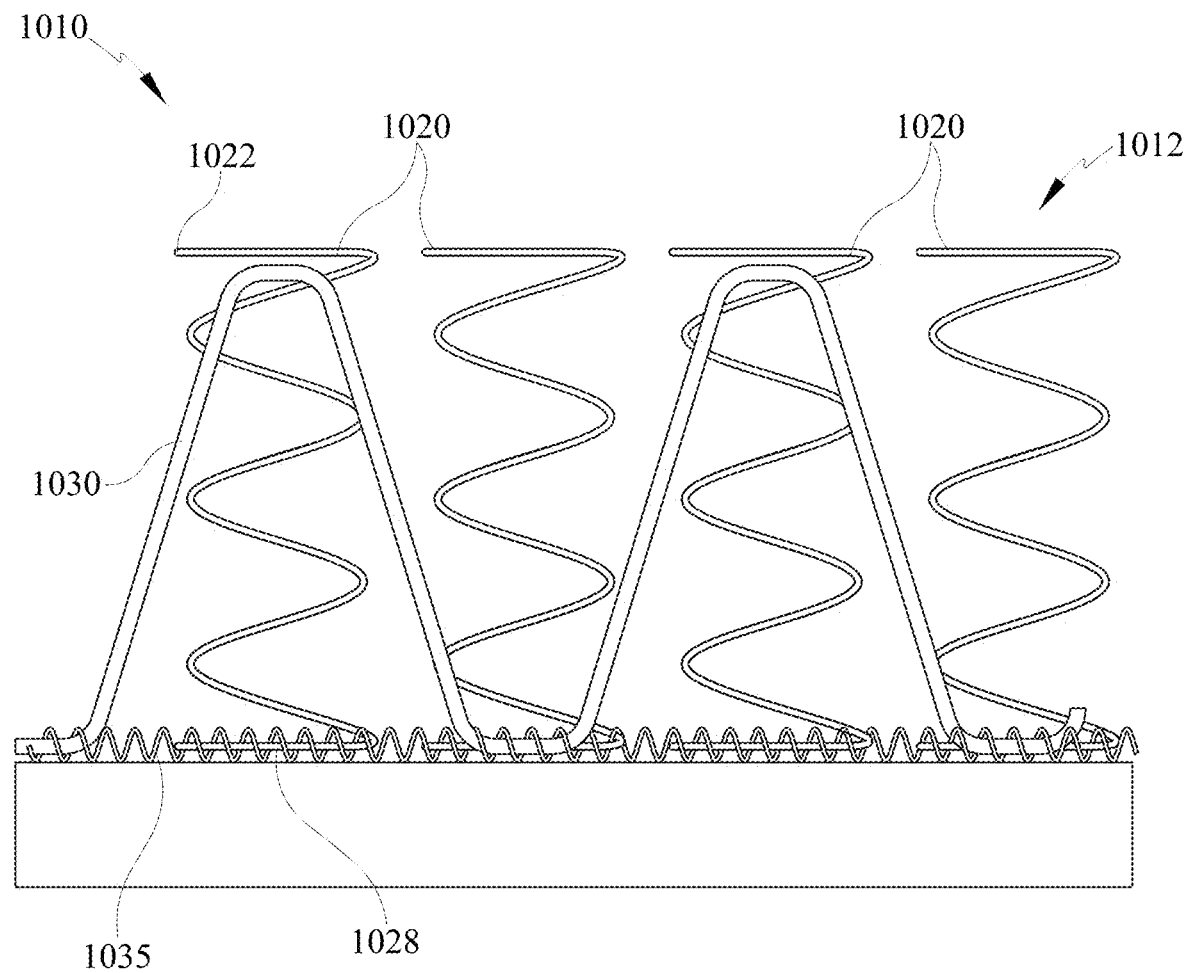
FIG. 13 is an alternate embodiment of that shown in FIG. 12 wherein elastic lacing may extend through a vertical dimension improve spring performance.

Referring now to FIG. 13, a further embodiment of an elastic lacing 1030 is provided. Similar to the embodiment of FIG. 12, the instant embodiment moves through a vertical dimension or plane as well as a horizontal plane. In this embodiment, the lacing 1030 may provide some preload characteristics, tensile or compression, as a well as damping and aid lateral stiffness. In this embodiment, a row 1012 is shown having a plurality of springs 1020, which may be any of a plurality of spring embodiments. The springs 1020 may be joined at the lower end convolutions 1028 by a lacing 1035. The elastic lacing 1030 may extend from a lower position in the assembly 1010, for example through the lower lacing wire 1035, to an upper position at or near the upper convolution 1022 of the spring 1020. For example, the lacing 1030 may be connected to the upper end convolution 1022 of spring 1020 or may be connected to some location below the upper end convolution 1022. Specifically, for non-limiting example, the elastic lacing 1030 may extend in a row direction from a lower lacing wire from left to right in the depicted embodiment. The elastic lacing 1030 may also extend upwardly to the top or near the top of a spring 1020, then back down to the lower lacing wire wherein the lower elevations of the elastic lacing 1030 are wider than at the upper elevation, within the spring 1020. The elastic lacing 1030 extends past a second, adjacent spring in the row. The lacing 1030 then extends upwardly again at the third spring (from the left). Thus, an alternative manner for providing a pre-load, damping or lateral stiffness is provided. These elastic lacings which move up and down, may also be connected to an upper elastic lacing (not shown) extending along a row of the springs and may be connected to each other and the springs in a variety of manners including any of those previously described.

Figure 14:
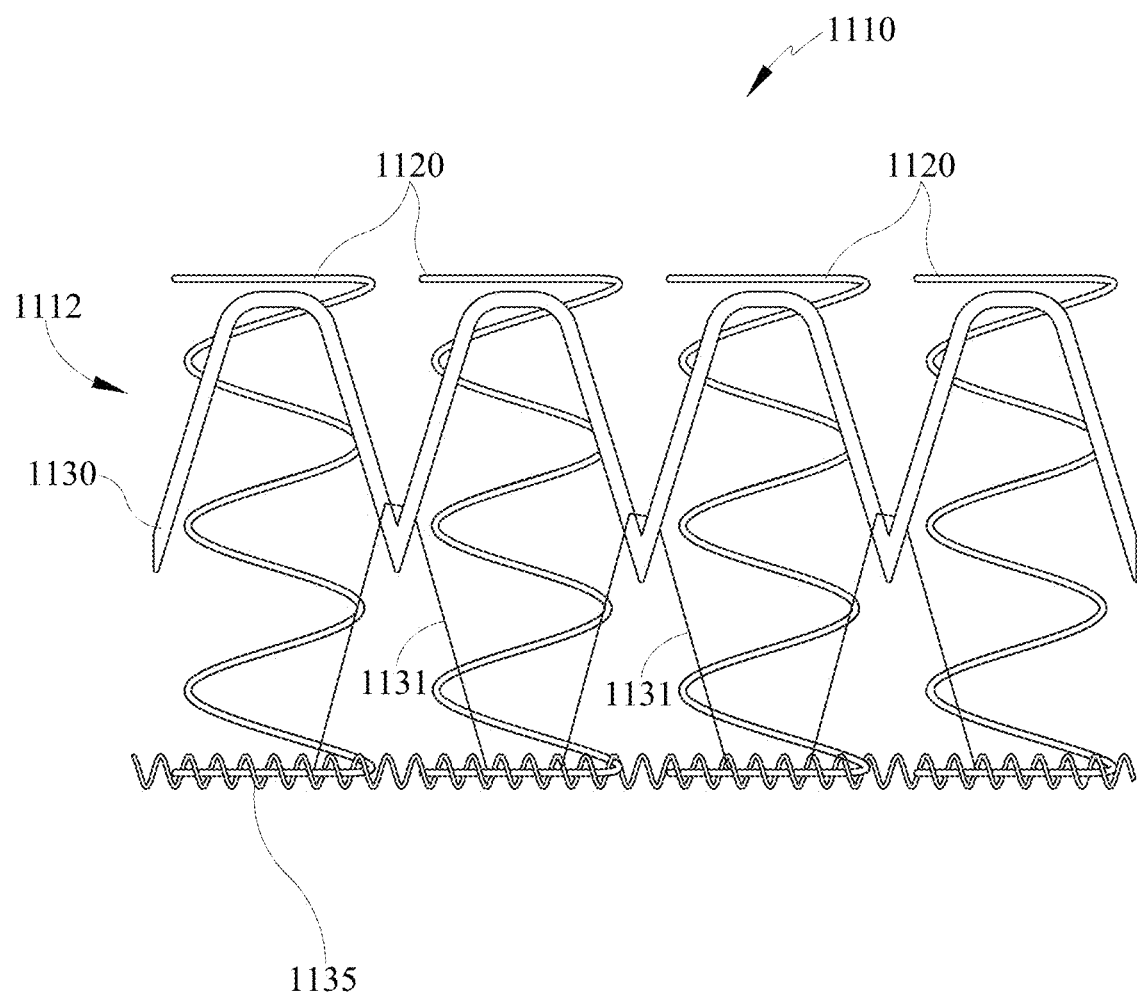
FIG. 14 is a further alternate embodiment of elastic lacings which provide multi-stage performance by using different materials and/or sizes which extend through a vertical dimension.

With reference to FIG. 14, a further embodiment is provided. Again the assembly 1110 is made up of rows 1112 of springs 1120 which may take any of various forms. The multiple elastic lacings 1130 which move upwardly from the lower lacing wire or lower portion of the assembly 1110 as in the previous embodiment. As shown in the instant embodiment, the upwardly moving lacings may be of differing elasticity, by differing size, material, other characteristics or combinations thereof. Accordingly, a multi-stage function may be provided. In the instant embodiment, the elastic lacing is defined by a first portion 1130 and a second portion 1131. The arrangement of differing size and/or materials provides two or more stages of elasticity and therefore performance when flexing. The lower portions 1131 may be connected to a lower lacing wire 1135 or to other relatively fixed structure at the base of the assembly 1110, such as a foam layer, for non-limiting example.

Further, while the springs 1120 are depicted as cylindrical type springs, this is merely illustrative of one embodiment. Other springs, some of which are shown in this disclosure, may also be utilized. For example some springs may be of differing shape, may have same or different shaped spring ends, or may be single or multi-stage springs by varying any of material, shape, size, pitch and the like. Still further, as mentioned previously, the springs 1120 may be coated with rubber, foam or other coatings to vary the springs' response and/or increase damping. However, it should be understand that the coating should not cause any damage to other structures or likewise should not be damaged by other structures of the assembly.

Figure 15:
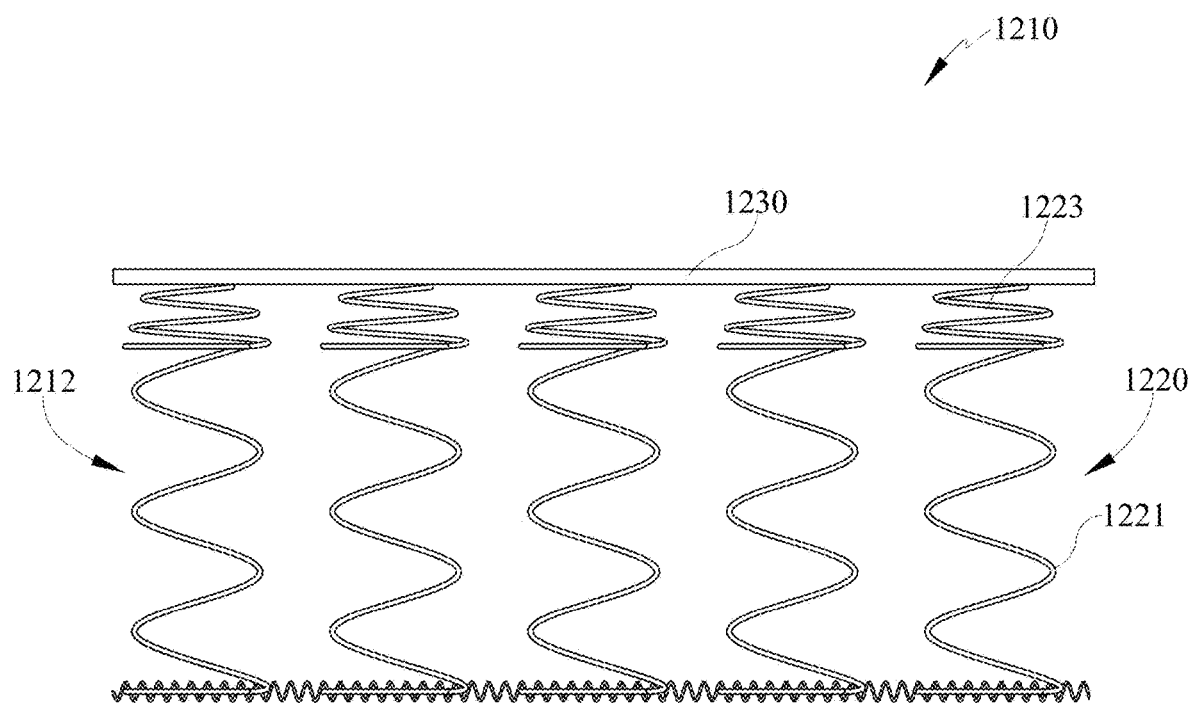
FIG. 15 is another embodiment of open coil spring assembly with multi-stage springs.

With reference to FIG. 15, a further embodiment is provided in elevation view. In this view an assembly 1210 is shown having at least one row 1212 of springs 1220. In still a further embodiment, the springs 1220 may be a plurality of multi-stage springs which may add compliance, stability and damping, which is desirable. The springs 1220 may have an upper portion 1223 with a first pitch and a lower portion 1221 with a second pitch. Alternatively, the first portion may be the lower portion and the second portion may be the upper portion. The gauge of the wire defining the spring 1220 may be the same or may differ. Also, the spring 1220 may be formed of a single material or may be formed of two or more materials.

The upper spring portion 1223 may be also be of the same diameter or may be of differing diameter than the lower spring portion 1221. Also, the size or diameters of the spring portions may vary. For non-limiting example, the diameter of the upper spring portion 1223 may have one size at the top which differs from the diameter at the bottom of the upper portion 1223. Otherwise stated, the upper spring portion may be frusto conical in shape, or other shapes which vary in size between axial ends. Still further, optionally the shapes of the coil may be the same or may differ when viewed from above.

The rows 1212 of springs 1220 may also comprise the elastic lacing 1230 as well. In some embodiments, the rows 1212 may extend in the head-to-toe direction and in other embodiments the rows 1212 may run in a side-to-side direction, or a combination of both depending on the arrangement of springs. The elastic lacing 1230 may also be located at different locations, or elevations.

In the instant embodiment, the elastic lacing 1230 may be positioned at the upper end of the springs 1220, rather than the lower end of the upper spring portion as in the previous embodiment (FIG. 5). In some alternatives, the elastic lacing 1230 is disposed at the top of the bottom spring portion, or the bottom of the upper spring portion. The clastic lacing 1230 may extend in parallel directions. In alternate embodiments, the elastic lacing may extend in two directions, such as the X, Y directions of the assembly 1210.

Figure 16:
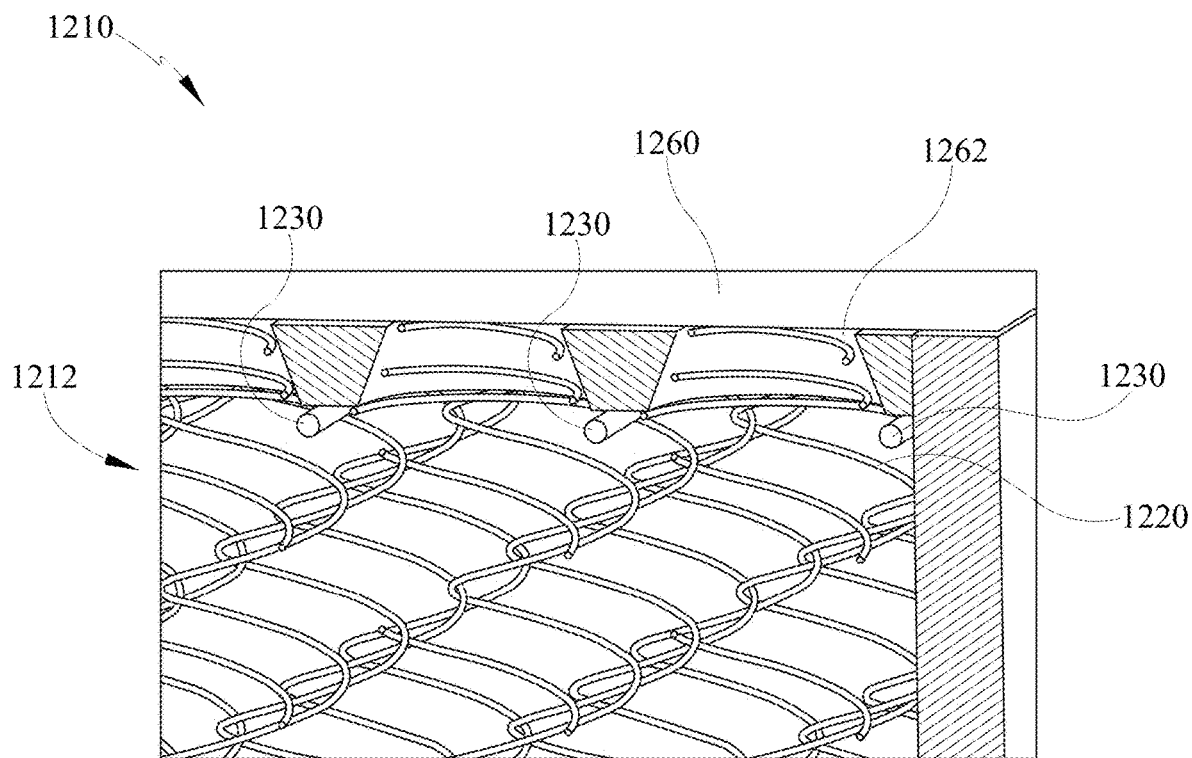
FIG. 16 is a further embodiment of FIG. 15 with an upper foam layer.

Referring to a further alternative of the multi-stage arrangement of FIG. 15, an additional structure is provided in FIG. 16 and is shown in the sectioned perspective embodiment. The instant embodiment provides that the elastic lacing 1230 extends in either or both of parallel or perpendicular directions to the rows 1212, wherein the rows 1212 may be defined, according to some embodiments, by the direction of the plurality of springs 1220 or direction of the lower lacing wire (not shown) or both. Alternatively, the lacing 1230 may extend in two directions, in a crossing pattern.

Still further, a layer of foam 1260 may be positioned over the upper ends of the springs 1220. The foam layer 1260 may include cut-outs or opening 1262 in a bottom surface to receive and locate the springs 1220. In this embodiment, the elastic lacing 1230 may be spaced from the upper end of the spring 1220, so that the spring may enter the opening in the foam 1260, or otherwise some amount of clearance may be created in the foam 1260 to also accept the elastic lacing 1230. In this way, the foam, upper spring portion, lower spring portion and the elastic lacing all work together to improve compliance, stability and performance of the innerspring assembly.

In still other embodiments, according to any of the embodiments in the instant disclosure, a fill material may be utilized between the coil springs. For example, a chipped foam or an insulation-like material may be blown into the assembly to occupy space in and around the springs. This may provide some additional damping without changing the architecture of the spring-cable assembly.

In some embodiments, the assembly 1210 may also optionally include an insert or dampers within to adjacent to springs as previously described in FIGS. 6, 8, 8*a*. The insert may be a foam, rubber or other material and may have a range of stiffnesses, which allow for some variation of the performance of the assembly. The inserts or dampers may add friction or damping to the spring performance while reducing bounce and may be oriented horizontally or vertically.

The inserts or dampers may be formed of various shapes. In some embodiments, simple shapes may be utilized, for example circular shape. However, in other embodiments, as previously described, the shape may be changed to match the opening between adjacent springs. This may depend on the orientation of the springs, the pitch, the diameter, or other characteristics of the assembly.

Figure 17:
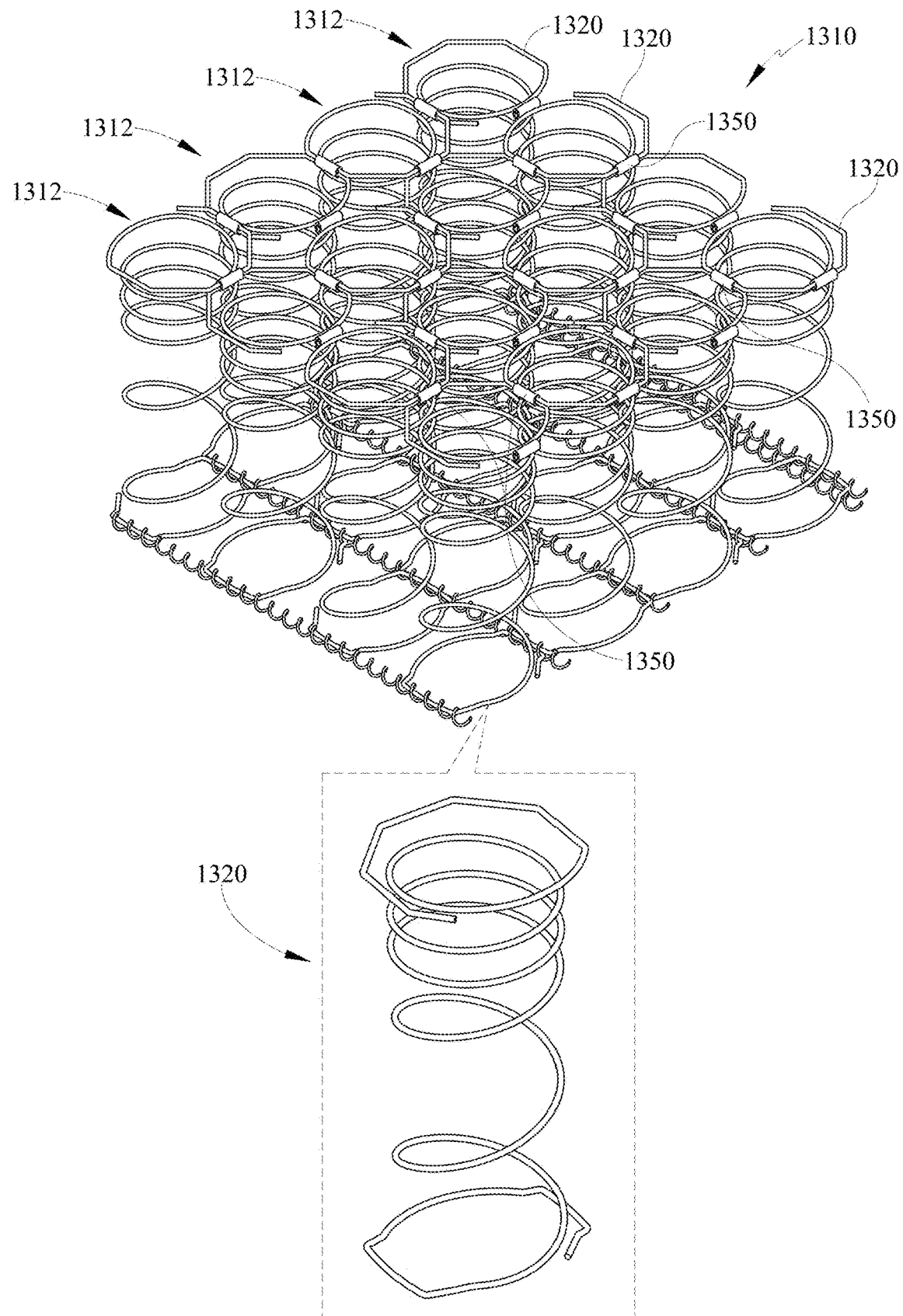
FIG. 17 is an alternate embodiment of a spring assembly and an exploded detail of one spring having a polygonal convolution end; and, FIG. 18 is another alternate spring assembly with an alternative convolution end.

Referring now to FIG. 17, a further embodiment is provided to depict an alternate spring shape, which is shown in an assembly perspective view including a detail perspective of one spring. According to some embodiments, an assembly 1310 is defined by a plurality of springs 1320 arranged in rows 1312, as with any of the previous embodiments. For example, the assembly 1310 provides a plurality of rows 1312 of springs 1320 which may be extending in a single direction and offset in the second direction, or may define rows in first and second directions.

The instant springs 1320 may have a single pitch or may be variable pitch as shown. As shown, in the detail, the spring 1320 has a lower portion with a first pitch and an upper second portion with a smaller pitch. The spring 1320 is also provided with varying coil shape at the upper convolutions ends and the lower end convolutions, as previously described. In the instant embodiment, the upper end of the spring 1320 may be of a generally polygonal shape. This is a general and non-limiting description due to the multiple sides or bars and even though the shape is not closed as a true polygon. The shape may be any of various forms, however the use of polygon shapes provides multiple sides or locations for positioning of clips 1350, which may be used to connect the springs 1320 and/or elastic lacing (not shown) or both. This allows for optimization of performance of the arrangement of the assembly 1310 by rotation of the springs, varying connection locations, and other previously described characteristics which have been discussed in altering and/or improving the performance.

Also shown in this embodiment are a plurality of clips 1350, which may be formed of a plurality of materials defining the elastic connections which may have some flexibility or may be more rigid in nature.

In the instant embodiment, the springs 1320 are aligned in two dimensions, defining rows 1312 in two dimensions.

Accordingly, the clips 1350 may be arranged in the head-to-toe direction and in the side-to-side direction. Further, as shown, the clips 1350 may be located or spaced variously to optimize a desired performance. For example, in one direction of the depicted embodiment, the clips 1350 are connecting each of the adjacent spring 1320, for example the head-to-toe direction. Alternatively, in the side-to-side direction, the clips 1320 may be used intermittently to reduce damping, improve compliance and/or optimize other characteristics of the assembly. Stated otherwise, the spacing of the clips 1320 in either or both directions may be modified in various manners to provide more or less compliance and/or more or less bounce and motion transfer.

Figure 18:
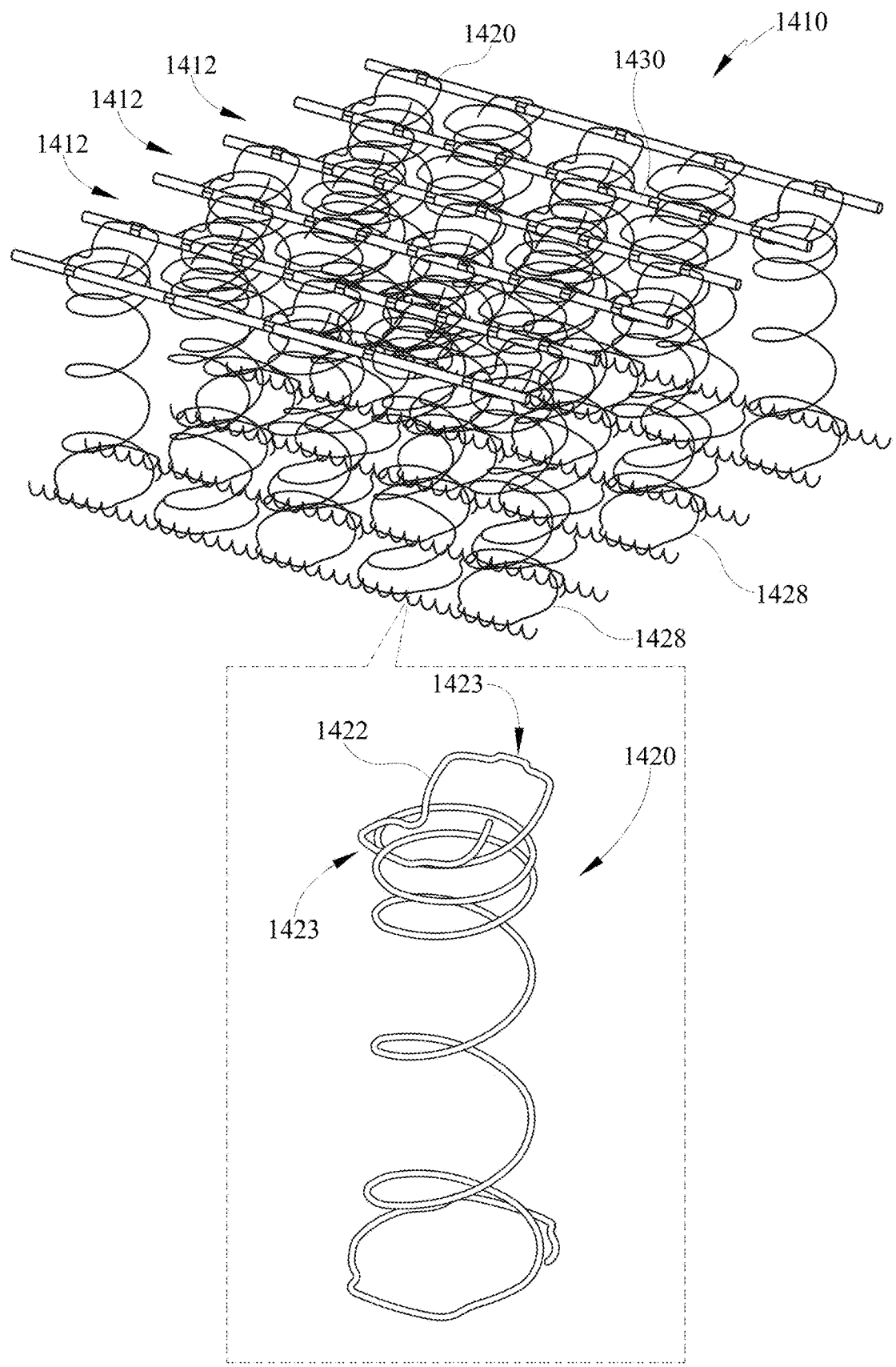

With reference now to FIG. 18, a further embodiment is provided wherein the innerspring has a further differing shape at one or both ends of the spring. The assembly 1410 provides a plurality of rows 1412 of springs 1420 which may be extending in a single direction and offset in the second direction, or may define rows in first and second directions. In this embodiment, the upper end convolution 1422 shape of the spring 1420 may be bent toward a second adjacent convolution below. This may improve coil performance by at least improving stability and reducing bounce of the springs 1420, and the assembly 1410 as a whole. The shape of the upper end convolution 1422 of the spring may also define wings which engage each of adjacent elastic lacings 1430. According to some embodiments, the wings 1423 may be clipped to the elastic lacing 1430 using the notches as previously described, or otherwise may engage the lacing 1430. The springs 1420 may also be clipped together in some embodiments or clipped together and to the elastic lacing 1430.

As with the previous embodiments, the lower end convolutions 1428 of the spring may be connected by various manners. For example, known lacings may be utilized. Or according to some alternatives, the springs may be embedded in a foam material.

Further the springs 1430 may also vary in other ways. The lower ends may be circular or other shapes, including but not limited to, any of the previously described shapes. Further, the spring 1430 may be of a single pitch (single stage) or may be of multiple pitches (multi-stage) type.

According to any of these embodiments, as compared to independent spring assemblies, where one spring is compressed and deflects, the deflection and compression of neighboring springs is limited more so than prior art spring assemblies.

One skilled in the art should understand that any of the embodiments described and/or shown may therefore be utilized with any of the other embodiments of the disclosure to provide any combination of embodiments. One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. An open coil spring assembly, comprising:
    a plurality of rows of open coil springs arranged in a matrix, each of the open coil springs including an upper end convolution, a lower end convolution, and a plurality of helical convolutions that extend between the upper end convolution and the lower end convolution;
    wherein a first side of the upper end convolution of a first coil spring of the open coil springs is bent to form a first clip, the first clip extending around and directly connecting the first side of the upper end convolution of the first coil spring to the upper end convolution of an adjacent second open coil spring of the open coil springs, such that the first coil spring pivots around the upper end convolution of the adjacent second coil spring,
    and wherein a second side of the upper end convolution of the first coil spring of the open coil springs is bent to form a second clip, the second clip extending around and directly connecting the second side of the upper end convolution of the first coil spring to the upper end convolution of an adjacent third open coil spring of the open coil springs, such that the first coil spring pivots around the upper end convolution of the adjacent third coil spring.

2. The open coil spring assembly of claim 1, wherein the first clip and the second clip each include two open-ended bends that partially enclose the upper end convolution of the adjacent second or third open coil spring.

3. The open coil spring assembly of claim 2, wherein each of the two open-ended bends of the first clip are spaced apart along the first side of the upper end convolution, and wherein each of the two open-ended bends of the second clip are spaced apart along the second side of the upper end convolution.

4. The open coil spring assembly of claim 1, wherein the second side is next to the first side.

5. The open coil spring assembly of claim 1, wherein the second side is opposite to the first side.

* * * * *